(12) United States Patent
Shibuya

(10) Patent No.: US 11,451,940 B2
(45) Date of Patent: Sep. 20, 2022

(54) DATA TRANSMISSION TERMINAL, DATA TRANSMISSION METHOD, AND RECORDING MEDIUM

(71) Applicant: OLYMPUS CORPORATION, Hachioji (JP)

(72) Inventor: Kazuyuki Shibuya, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 114 days.

(21) Appl. No.: 17/108,349

(22) Filed: Dec. 1, 2020

(65) Prior Publication Data

US 2021/0092571 A1 Mar. 25, 2021

Related U.S. Application Data

(63) Continuation of application No. PCT/JP2018/022924, filed on Jun. 15, 2018.

(51) Int. Cl.
*H04W 4/38* (2018.01)
*H04B 1/59* (2006.01)
*H04L 67/12* (2022.01)
*H04W 84/18* (2009.01)

(52) U.S. Cl.
CPC .......... *H04W 4/38* (2018.02); *H04B 1/59* (2013.01); *H04L 67/12* (2013.01); *H04W 84/18* (2013.01)

(58) Field of Classification Search
CPC . H04L 4/38; H04L 67/12; H04B 1/59; H04W 84/18; B60K 6/24; B60W 20/10
See application file for complete search history.

(56) References Cited

U.S. PATENT DOCUMENTS 9,738,125 B1 * 8/2017 Brickley ............... B60W 50/14

FOREIGN PATENT DOCUMENTS

| JP | 2006-86605 A | 3/2006 |
|---|---|---|
| JP | 2012-239137 A | 12/2012 |
| JP | 2014-215632 A | 11/2014 |
| JP | 2015-50634 A | 3/2015 |

OTHER PUBLICATIONS

International Search Report dated Sep. 18, 2018, issued in counterpart International Application No. PCT/JP2018/022924, with English Translation. (2 pages).

* cited by examiner

*Primary Examiner* — Iqbal Zaidi
(74) *Attorney, Agent, or Firm* — WHDA, LLP

(57) ABSTRACT

In a data transmission terminal, a processor is configured to determine whether or not a change greater than or equal to a predetermined amount has occurred between values represented by multiple pieces of first sensor data stored on a memory when a state of communication has shifted from a normal state to a disconnected state. The processor is configured to classify the multiple pieces of the first sensor data as changed data and unchanged data when the processor determines that the change has occurred. The processor is configured to transmit the changed data to the external terminal by using a communicator. The processor is configured to transmit the unchanged data to the external terminal by using the communicator after the changed data are transmitted to the external terminal.

11 Claims, 14 Drawing Sheets

DATA TRANSMISSION TERMINAL, DATA TRANSMISSION METHOD, AND RECORDING MEDIUM

The present application is a continuation application based on International Patent Application No. PCT/JP2018/022924 filed on Jun. 15, 2018, the content of which is incorporated herein by reference.

BACKGROUND OF THE INVENTION

Field of the Invention

The present invention relates to a data transmission terminal, a data transmission method, and a recording medium.

Description of Related Art

Not only PCs and smartphones but also various devices have been able to wirelessly connect to each other in recent years. Wireless communication technologies of various standards for connection have appeared. There are mobile phone networks. IEEE802.11, and Bluetooth (registered trademark) as communication standards that have been widely used. In addition to these, various communication standards classified as low-power wide area (LPWA) or various communication standards using a mesh network have been used.

FIG. 13 shows a mechanism by which a device DE connects to a wide area network (WAN). The WAN is connected to the Internet NET. A server SE is connected to the Internet NET. In many of the above-described communication standards, the device DE can connect to the server SE via the WAN. In order for a device to connect to the WAN, the device needs to be capable of communicating with an apparatus OW. The apparatus GW is an apparatus that connects to the WAN. The apparatus GW has a gateway function.

There is a case in which the connection between the device DE and the apparatus GW is interrupted and becomes a disconnected state. For example, the reason for the phenomenon is deterioration of the communication environment due to a temporary obstacle or the like. Another reason for the phenomenon is a malfunction or a breakdown of the apparatus GW. Another reason for the phenomenon is a malfunction, a breakdown, or the like of the relay device that relays communication between the device DE and the apparatus GW. A storage device is disposed on the device DE side on the assumption of such a situation. The storage device records data generated during the communication disconnection. After the communication is restored from the disconnected state, the device DE can transmit the data recorded during the communication disconnection to the server SE via the apparatus GW.

An example in which a sensor device group, the apparatus GW, and the server SE are disposed will be described. The sensor device group is located outdoors. The apparatus GW wirelessly receives sensor data from the sensor device group. The server SE connects to the apparatus GW via the WAN. In a case in which the sensor device is in the disconnected state and is unable to communicate with the apparatus GW, sensor data periodically acquired are recorded on a storage device in the sensor device. After the communication is restored, the sensor device can transmit the recorded sensor data to the server SE via the apparatus GW.

The LPWA is used by a sensor device or the like. The communication band of the wireless communication standards using the LPWA and the communication band of the wireless communication standards using a mesh network are narrower than the communication band of mobile phone networks and the communication band of IEEE802.11. For example, the communication band of the wireless communication standards using the LPWA and the communication band of the wireless communication standards using a mesh network are several tens of bps to several hundred kbps. Therefore, the device DE tends to be unable to transmit a great deal of data in a short period of time.

In order for the device DE to efficiently perform communication with low power consumption, there is a case in which the schedule of a communication timing in each device DE is predetermined. The device DE can perform communication only at the timing. FIG. 14 shows an example in which the schedule of communication timings is predetermined and the communication becomes the disconnected state.

A period in which the device DE can perform communication is allocated to the device DE as a time slot TS. The time slot TS includes a period TS1 and a period TS2. The device DE can transmit data in the period TS1. The time slot TS is intermittently allocated to the device DE. In the period TS1, the device DE transmits data acquired between two adjacent time slots TS. The device DE stops transmission in the period TS2. The period TS2 is a period of idle time in which communication is not performed.

In the current time slot TS, the data acquired in the time slot TS immediately before the current time slot TS to the current time slot TS are transmitted to the apparatus GW or another relay device. The data acquired during the communication disconnection are recorded on a storage device SR. In a time slot TSc arriving after the communication is restored from the disconnected state, the device DE tries to transmit both the data acquired in real time and the data recorded on the storage device SR. In the time slot TSc, the device DE is unable to complete transmission of the data recorded during the disconnection due to the restriction of the communication band or the restriction of the communication timing. Therefore, the device DE is unable to transmit the data acquired in a period immediately before the time slot TSc. It takes a considerable amount of time for the server SE to complete acquisition of the data recorded during the disconnection. The server SE is unable to receive the data in real time.

Japanese Unexamined Patent Application, First Publication No. 2015-050634 presents a method of resolving this problem. In a case in which sensor data output from a sensor have changed by greater than or equal to a predetermined value, a device transmits the sensor data after a predetermined delay time passes. The delay time is determined on the basis of both the degree of importance of the sensor data and the idle state of wireless resources. Highly important sensor data are transmitted at an earlier timing. Sensor data are transmitted at more distributed timings as fewer wireless resources remain.

For example, the device classifies a various pieces of sensor data as important data and unimportant data in accordance with purposes for which a server monitors the sensor data. A monitoring person is unable to confirm the states of sensors during the communication disconnection. Immediately after the communication is restored from the disconnected state, the monitoring person needs to confirm whether or not abnormalities about important sensor data have occurred in a disconnected period. In a case in which the abnormalities have occurred, the monitoring person needs to confirm other sensor data in order to examine how the abnormalities have occurred or examine countermeasures against the abnormalities. Other sensor data are related to the sensor data in which the abnormalities have occurred.

SUMMARY OF THE INVENTION

According to a first aspect of the present invention, a data transmission terminal includes a first sensor, a memory, a communicator, and a processor. The processor is configured to transmit first sensor data output from the first sensor to an external terminal by using the communicator. The processor is configured to determine a state of communication between the communicator and the external terminal. The processor is configured to store multiple pieces of the first sensor data on the memory in a time-series manner when the processor determines that the state of the communication has shifted from a normal state to a disconnected state. The processor is configured to determine whether or not a change greater than or equal to a predetermined amount has occurred between values represented by the multiple pieces of the first sensor data stored on the memory when the processor determines that the state of the communication has shifted from the disconnected state to the normal state. The processor is configured to classify the multiple pieces of the first sensor data stored on the memory as changed data and unchanged data when the processor determines that the change has occurred. The changed data are output from the first sensor in a period in which the change occurs. The unchanged data are output from the first sensor in a period different from the period in which the change occurs. The processor is configured to transmit the changed data to the external terminal by using the communicator. The processor is configured to transmit the unchanged data to the external terminal by using the communicator after the changed data are transmitted to the external terminal.

According to a second aspect of the present invention, in the first aspect, the data transmission terminal may further include a second sensor different from the first sensor. The processor may be configured to transmit second sensor data output from the second sensor to the external terminal by using the communicator. The processor may be configured to store multiple pieces of the second sensor data on the memory in a time-series manner when the processor determines that the state of the communication has shifted from the normal state to the disconnected state. The processor is configured to classify the multiple pieces of the second sensor data stored on the memory as related data and unrelated data when the processor determines that the change has occurred. The related data are output from the second sensor in the period in which the change occurs. The unrelated data are output from the second sensor in a period different from the period in which the change occurs. The processor may be configured to transmit the changed data and the related data to the external terminal by using the communicator. The processor may be configured to transmit the unchanged data and the unrelated data to the external terminal by using the communicator after the changed data and the related data are transmitted to the external terminal.

According to a third aspect of the present invention, in the first aspect, the processor may be configured to store multiple pieces of third sensor data on the memory in a time-series manner. The multiple pieces of the third sensor data are the first sensor data output from the first sensor after the processor determines that the state of the communication has shifted from the disconnected state to the normal state and are the first sensor data output from the first sensor before transmission of the changed data and the unchanged data is completed. The processor may be configured to determine whether or not the change has occurred on the basis of the multiple pieces of the third sensor data stored on the memory. The processor may be configured to classify the multiple pieces of the third sensor data stored on the memory as the changed data and the unchanged data when the processor determines that the change has occurred.

According to a fourth aspect of the present invention, a data transmission terminal includes a first sensor, a memory, a communicator, and a processor. The processor is configured to transmit first sensor data output from the first sensor to an external terminal by using the communicator. The processor is configured to determine a state of communication between the communicator and the external terminal. The processor is configured to store multiple pieces of the first sensor data on the memory in a time-series manner when the processor determines that the state of the communication has shifted from a normal state to a disconnected state. The processor is configured to generate processed data by processing the first sensor data output from the first sensor or the first sensor data stored on the memory. The processor is configured to determine whether or not a change greater than or equal to a predetermined amount has occurred between values represented by the multiple pieces of the first sensor data stored on the memory when the processor determines that the state of the communication has shifted from the disconnected state to the normal state. The processor is configured to classify the multiple pieces of the first sensor data stored on the memory as changed data and unchanged data when the processor determines that the change has occurred. The changed data are output from the first sensor in a period in which the change occurs. The unchanged data are output from the first sensor in a period different from the period in which the change occurs. The processor is configured to transmit the processed data to the external terminal by using the communicator. The processor is configured to transmit the unchanged data to the external terminal by using the communicator after the processed data are transmitted to the external terminal.

According to a fifth aspect of the present invention, a data transmission terminal includes a first sensor, a memory, a communicator, and a processor. The processor is configured to transmit first sensor data output from the first sensor to an external terminal by using the communicator. The processor is configured to determine a state of communication between the communicator and the external terminal. The processor is configured to store multiple pieces of the first sensor data on the memory in a time-series manner when the processor determines that the state of the communication has shifted from a normal state to a disconnected state. The processor is configured to determine whether or not a change greater than or equal to a predetermined amount has occurred between values represented by the multiple pieces of the first sensor data stored on the memory when the processor determines that the state of the communication has shifted from the disconnected state to the normal state. The processor is configured to classify the multiple pieces of the first sensor data stored on the memory as changed data and unchanged data when the processor determines that the change has occurred. The changed data are output from the first sensor in a period in which the change occurs. The unchanged data are output from the first sensor in a period different from the period in which the change occurs. The processor is configured to generate processed data by processing the changed data. The processor is configured to transmit the processed data to the external terminal by using the communicator. The processor is configured to transmit the unchanged data to the external terminal by using the communicator after the processed data are transmitted to the external terminal.

According to a sixth aspect of the present invention, in the fifth aspect, the processor may be configured to analyze temporal transition of the multiple pieces of the first sensor data and generate the processed data that represent a summary of the transition.

According to a seventh aspect of the present invention, in the fifth aspect, the processor may be configured to analyze temporal transition of multiple pieces of the changed data and generate the processed data that represent a summary of the transition.

According to an eighth aspect of the present invention, in the fourth or fifth aspect, the processor may be configured to transmit the processed data and the unchanged data to the external terminal by using the communicator when the processor determines that the state of the communication has shifted from the disconnected state to the normal state. The processor may be configured to transmit the changed data to the external terminal by using the communicator after the processed data and the unchanged data are transmitted to the external terminal.

According to a ninth aspect of the present invention, a data transmission method of a data transmission terminal includes a first step, a second step, a third step, a fourth step, a fifth step, a sixth step, and a seventh step. The data transmission terminal includes a first sensor, a memory, a communicator, and a processor. The processor transmits first sensor data output from the first sensor to an external terminal by using the communicator in the first step. The processor determines a state of communication between the communicator and the external terminal in the second step. The processor stores multiple pieces of the first sensor data on the memory in a time-series manner in the third step when the processor determines that the state of the communication has shifted from a normal state to a disconnected state. The processor determines whether or not a change greater than or equal to a predetermined amount has occurred between values represented by the multiple pieces of the first sensor data stored on the memory in the fourth step when the processor determines that the state of the communication has shifted from the disconnected state to the normal state. The processor classifies the multiple pieces of the first sensor data stored on the memory as changed data and unchanged data in the fifth step when the processor determines that the change has occurred. The changed data are output from the first sensor in a period in which the change occurs. The unchanged data are output from the first sensor in a period different from the period in which the change occurs. The processor transmits the changed data to the external terminal by using the communicator in the sixth step. The processor transmits the unchanged data to the external terminal by using the communicator after the changed data are transmitted to the external terminal in the seventh step.

According to a tenth aspect of the present invention, a non-transitory computer-readable recording medium saves a program for causing a processor of a data transmission terminal to execute a first step, a second step, a third step, a fourth step, a fifth step, a sixth step, and a seventh step. The data transmission terminal includes a first sensor, a memory, a communicator, and a processor. The processor transmits first sensor data output from the first sensor to an external terminal by using the communicator in the first step. The processor determines a state of communication between the communicator and the external terminal in the second step. The processor stores multiple pieces of the first sensor data on the memory in a time-series manner in the third step when the processor determines that the state of the communication has shifted from a normal state to a disconnected state. The processor determines whether or not a change greater than or equal to a predetermined amount has occurred between values represented by the multiple pieces of the first sensor data stored on the memory in the fourth step when the processor determines that the state of the communication has shifted from the disconnected state to the normal state. The processor classifies the multiple pieces of the first sensor data stored on the memory as changed data and unchanged data in the fifth step when the processor determines that the change has occurred. The changed data are output from the first sensor in a period in which the change occurs. The unchanged data are output from the first sensor in a period different from the period in which the change occurs. The processor transmits the changed data to the external terminal by using the communicator in the sixth step. The processor transmits the unchanged data to the external terminal by using the communicator after the changed data are transmitted to the external terminal in the seventh step.

DETAILED DESCRIPTION OF THE INVENTION

Hereinafter, embodiments of the present invention will be described with reference to the drawings.

First Embodiment

Figure 1:
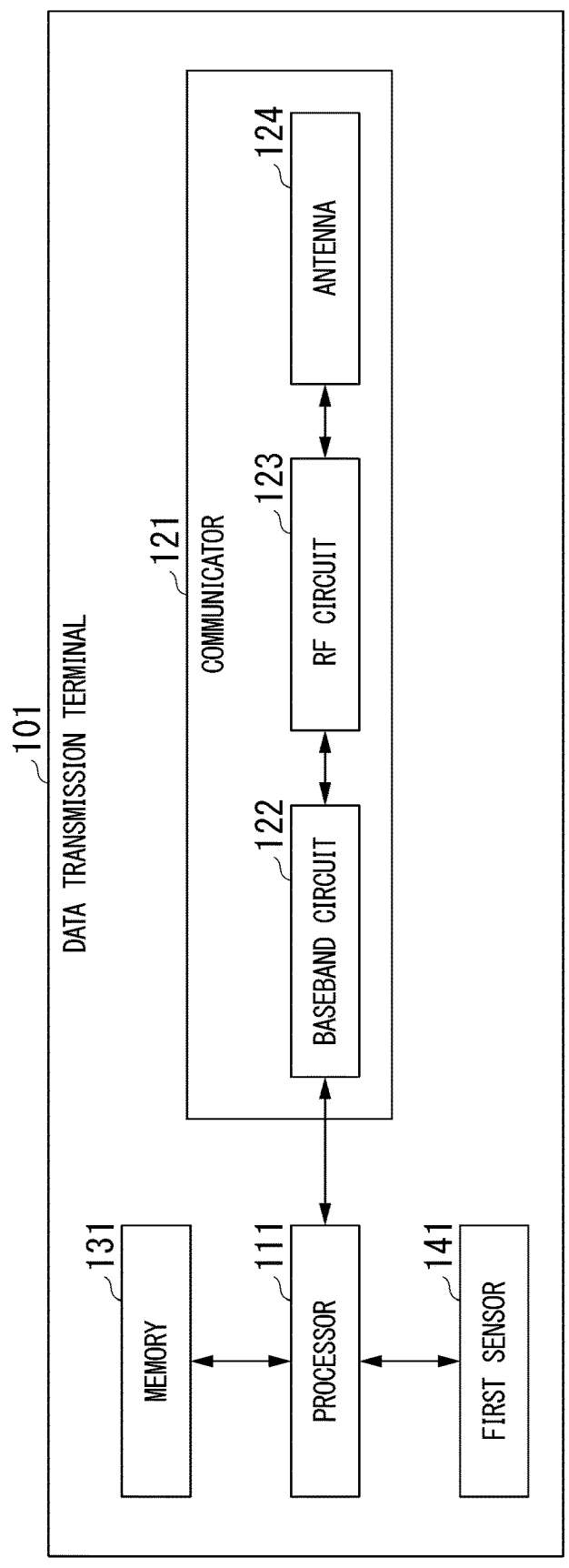
FIG. 1 is a block diagram showing a configuration of a data transmission terminal according to a first embodiment of the present invention.

FIG. 1 shows a configuration of a data transmission terminal 101 according to a first embodiment of the present invention. The data transmission terminal 101 shown in FIG. 1 includes a processor 111, a communicator 121, a memory 131, and a first sensor 141.

A schematic configuration of the data transmission terminal 101 will be described. The processor 111 transmits first sensor data output from the first sensor 141 to an external terminal by using the communicator 121. The external terminal is different from the data transmission terminal 101. The processor 111 determines a state of communication between the communicator 121 and the external terminal. When the processor 111 determines that the state of the communication has shifted from a normal state to a disconnected state, the processor 111 stores the first sensor data on the memory 131 in a time-series manner. When the processor 111 determines that the state of the communication has shifted from the disconnected state to the normal state, the processor 111 determines whether or not a change greater than or equal to a predetermined amount has occurred on the basis of multiple pieces of first sensor data stored on the memory 131. When the processor 111 determines that the change greater than or equal to the predetermined amount has occurred, the processor 111 classifies the multiple pieces of first sensor data stored on the memory 131 as changed data and unchanged data. The changed data are related to a period in which the change occurs and are output from the first sensor 141 in a period in which the change occurs. The unchanged data are not related to the period in which the change occurs and are output from the first sensor 141 in a period different from the period in which the change occurs. The processor 111 transmits the changed data to the external terminal by using the communicator 121. After the changed data are transmitted to the external terminal, the processor 111 transmits the unchanged data to the external terminal by using the communicator 121.

A detailed configuration of the data transmission terminal 101 will be described. For example, the processor 111 is at least one of a central processing unit (CPU), a digital signal processor (DSP), and a graphics-processing unit (GPU). The data transmission terminal 101 may include one or a plurality of processors. In FIG. 1, one processor 111 is shown. The processor 111 may be at least one of a dedicated IC, an application-specific integrated circuit (ASIC), and a field-programmable gate array (FPGA).

The processor 111 may read a program and execute the read program. The program includes commands defining the operations of the processor 111. In other words, the functions of the processor 111 may be realized by software. The program, for example, may be provided by using a "computer-readable recording medium" such as a flash memory. The program may be transmitted from a computer storing the program to the data transmission terminal 101 through a transmission medium or by using carrier waves in a transmission medium. The "transmission medium" transmitting a program is a medium that has a function of transmitting information. The medium that has the function of transmitting information includes a network (communication network) such as the Internet and a communication circuit line (communication line) such as a telephone circuit line. The program described above may realize at least some of the functions described above. Furthermore, the program described above may be a differential file (differential program). The combination of a program that has already been recorded in a computer and a differential program may realize the functions described above.

For example, the communicator 121 is a wireless module. The communicator 121 includes a baseband circuit 122, an RF circuit 123, and an antenna 124.

The baseband circuit 122 performs digital signal processing in accordance with an instruction from the processor 111 and converts a digital signal into an analog signal through D/A conversion. The analog signal generated by the baseband circuit 122 is output to the RF circuit 123. In addition, the baseband circuit 122 converts an analog signal output from the RF circuit 123 into a digital signal through A/D conversion and processes the digital signal. The processor 111 controls part of the processing in the media access control (MAC) layer among processing performed on the digital signal by the baseband circuit 122. The MAC layer is included in the data link layer.

The RF circuit 123 modulates the analog signal output from the baseband circuit 122 into an analog signal of a frequency band of carrier waves. The analog signal modulated by the RF circuit 123 is output to the antenna 124. In addition, the RF circuit 123 demodulates the analog signal of the frequency band of carrier waves output from the antenna 124. The analog signal demodulated by the RF circuit 123 is output to the baseband circuit 122. The antenna 124 converts the analog signal output from the RF circuit 123 into radio waves and transmits the radio waves to the external terminal. In addition, the antenna 124 receives radio waves transmitted from the external terminal and converts the received radio waves into an analog signal. The analog signal processed by the antenna 124 is output to the RF circuit 123.

In the example shown in FIG. 1, the antenna 124 is disposed inside the communicator 121. The antenna 124 may be disposed outside the communicator 121.

The processor 111 is disposed outside the communicator 121 and controls the entire operations of the data transmission terminal 101. The processor 111 controls the baseband circuit 122, the memory 131, and the first sensor 141. In a case in which the data transmission terminal 101 includes a display unit, an operation unit, or the like not shown in FIG. 1, the processor 111 controls the display unit, the operation unit, or the like. A processor disposed inside the communicator 121 may control the baseband circuit 122 in place of the processor 111. In such a case, the processor 111 controls the processor inside the communicator 121.

The processor 111 transmits sensor data to the external terminal by using the communicator 121. Specifically, the processor 111 controls the communicator 121 such that sensor data are transmitted to the external terminal. In other words, the processor 111 causes the communicator 121 to transmit sensor data for the external terminal. In this way, the communicator 121 transmits sensor data to the external terminal. For example, the external terminal is a terminal that has a gateway function. The external terminal may be a relay terminal that receives sensor data from the data transmission terminal 101 and transmits the sensor data to a terminal that has a gateway function.

The memory 131 is a volatile or nonvolatile storage medium. For example, the memory 131 is at least one of a random-access memory (RAM), a dynamic random-access memory (DRAM), a static random-access memory (SRAM), an electrically erasable programmable read-only memory (EEPROM), and a flash memory.

For example, each embodiment of the present invention is used for monitoring mountains. For example, each embodiment of the present invention is used for monitoring a disaster. The disaster is a landslide, a wildfire, an avalanche, a volcanic eruption, or the like. Each embodiment of the present invention is used for monitoring a state of fall foliage, a blooming state of cherry blossoms, a state of snow coverage, or the like. Each embodiment of the present invention is used for monitoring various amusements.

Types of sensor data to be acquired are different in accordance with objectives of performing monitoring. A monitoring person confirms a certain state of a disaster, cherry blossoms in bloom, or the like. The monitoring person determines whether or not the certain state is likely to occur. When the certain state occurs, the monitoring person confirms the cause and details of the state. Because of such reasons, a great deal of data of an image, temperature, humidity, precipitation, or the like may be acquired.

The first sensor 141 is a sensor such as an image sensor or a weather sensor. The first sensor 141 measures a physical quantity of an object and generates first sensor data that represent a measurement result. The first sensor 141 outputs the generated first sensor data to the processor 111. In the following descriptions, the first sensor data may be called sensor data. The data transmission terminal 101 may include a plurality of sensors including the first sensor 141.

Figure 2:
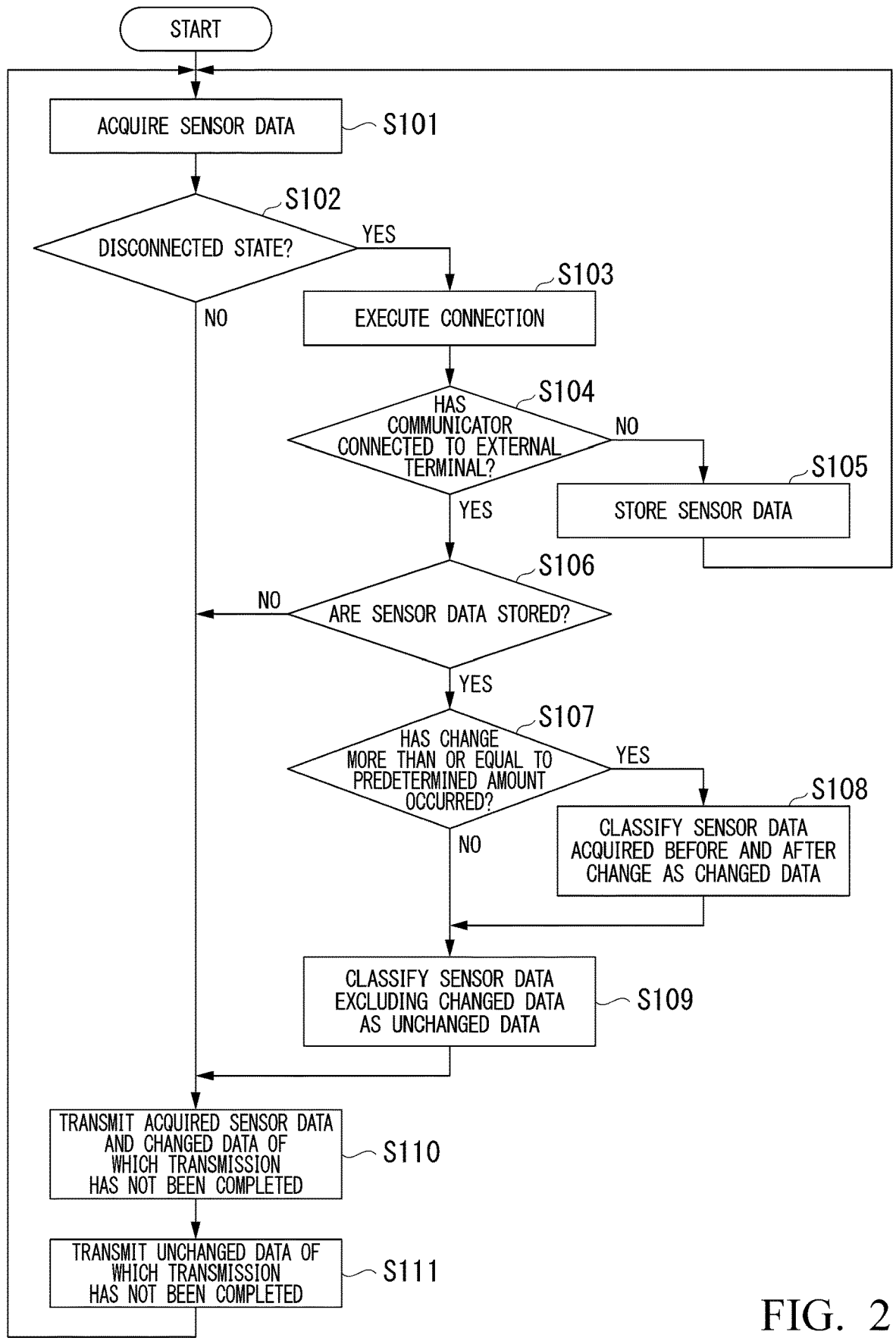
FIG. 2 is a flow chart showing a procedure of an operation of the data transmission terminal according to the first embodiment of the present invention.

An operation of the data transmission terminal 101 will be described. FIG. 2 shows a procedure of the operation of the data transmission terminal 101.

(Step S101)

The processor 111 periodically acquires sensor data from the first sensor 141. After the data transmission terminal 101 is activated, the processing in Step S101 is executed. Alternatively, after Step S105 described later or after Step S111 described later, the processing in Step S101 is executed. If a timing at which the processing in Step S105 or the processing in Step 111 is executed is not a timing of acquiring sensor data, the processor 111 waits until the timing of acquiring sensor data.

(Step S102)

After Step S101, the processor 111 determines whether the communication state is a disconnected state. For example, when the processor 111 executes disconnection, the processor 111 determines that the communication state is the disconnected state. When an explicit disconnection instruction or an explicit disconnection notification is received from the external terminal, the processor 111 may determine that the communication state is the disconnected state. When connection is not performed after the communicator 121 starts its operation, the processor 111 may determine that the communication state is the disconnected state. When the communicator 121 is in a sleep state, the communicator 121 may not keep connection. When connection is not performed after the communicator 121 is restored from the sleep state to a normal state, the processor 111 may determine that the communication state is the disconnected state. When data transmission and re-transmission to the external terminal have failed, the processor 111 may determine that the communication state is the disconnected state. When the communicator 121 is unable to receive packets periodically transmitted from the external terminal for a certain period, the processor 111 may determine that the communication state is the disconnected state.

When the communication state is not the disconnected state in Step S102, the processor 111 determines that the communication state is a normal state. When the communication state is the normal state, the connection between the communicator 121 and the external terminal is maintained and the communicator 121 is able to communicate with the external terminal. In this case, the processing in Step S110 is executed. Details of the processing in Step S110 will be described later.

(Step S103)

When the processor 111 determines that the communication state is the disconnected state in Step S102, the processor 111 executes connection to the external terminal by using the communicator 121. In this way, the data transmission terminal 101 can communicate with the external terminal. The processor 111 causes the communicator 121 to connect to the external terminal.

(Step S104)

After Step S103, the processor 111 determines whether or not the communicator 121 has connected to the external terminal.

(Step S105)

When the processor 111 determines that the communicator 121 has not connected to the external terminal in Step S104, the processor 111 stores the sensor data acquired in Step S101 on the memory 131. In this case, the communication state is the disconnected state. Time point information is attached to the sensor data. The time point information represents a time point at which the sensor data are generated. The memory 131 stores the sensor data in a time-series manner. In other words, the memory 131 stores the sensor data in accordance with the order in which the sensor data are output from the first sensor 141. The processor 111 identifies the order of the sensor data on the basis of the time point information. After Step S105, the processing in Step S101 is executed.

(Step S106)

When the processor 111 determines that the communicator 121 has connected to the external terminal in Step S104, the processor 111 determines whether or not the sensor data are stored on the memory 131. When the processor 111 determines that the sensor data are not stored on the memory 131 in Step S106, the processing in Step S110 is executed.

(Step S107)

When the processor 111 determines that the sensor data are stored on the memory 131 in Step S106, the processor 111 determines whether or not a change greater than or equal to a predetermined amount has occurred on the basis of the sensor data stored on the memory 131. The processor 111 determines whether or not the change greater than or equal to the predetermined amount has occurred on the basis of multiple pieces of sensor data. For example, the multiple pieces of sensor data are two pieces of temporally consecutive sensor data. When only one piece of sensor data is stored on the memory 131, the processing in Step S107 is not executed. For example, the processor 111 calculates the difference between a physical quantity represented by the sensor data at a first time point and a physical quantity represented by the sensor data at a second time point. The second time point is different from the first time point. When the difference is greater than or equal to a predetermined value, the processor 111 determines that the change greater than or equal to the predetermined amount has occurred. When the difference is less than the predetermined value, the processor 111 determines that the change greater than or equal to the predetermined amount has not occurred. When the processor 111 determines that the change greater than or equal to the predetermined amount has not occurred in Step S107, the processing in Step S109 is executed. Details of the processing in Step S109 will be described later.

For example, a threshold value of determination in Step S107 is stored on the memory 131 in advance. The threshold value may be set through a user's operation of an operation unit not shown in the drawing. The communicator 121 may receive information that represents the threshold value from the external terminal and the received information may be stored on the memory 131. Information that represents the threshold value may be received from the external terminal through communication using another communicator not shown in the drawing and the received information may be stored on the memory 131. A recording medium on which information that represents the threshold value is recorded may be connected to the data transmission terminal 101 and the information read from the recording medium may be stored on the memory 131.

(Step S108)

When the processor 111 determines that the change greater than or equal to the predetermined amount has occurred in Step S107, the processor 111 classifies the sensor data acquired before and after the change as changed data. The sensor data classified as the changed data include the sensor data acquired at a time point at which the change has occurred and the sensor data acquired immediately before the time point. For example, in a case in which the change occurs between the sensor data at a first time point and the sensor data at a second time point, the sensor data classified as the changed data include the sensor data at the first time point and the sensor data at the second time point. The sensor data classified as the changed data may include one or multiple pieces of sensor data acquired before a time point immediately before the time point at which the change has occurred. The sensor data classified as the changed data may include one or multiple pieces of sensor data acquired after the time point at which the change has occurred.

For example, the range of data included in the changed data is stored on the memory 131 in advance. The range may be set through a user's operation of an operation unit not shown in the drawing. The communicator 121 may receive information that represents the range from the external terminal and the received information may be stored on the memory 131. Information that represents the range may be received from the external terminal through communication using another communicator not shown in the drawing and the received information may be stored on the memory 131. A recording medium on which information that represents the range is recorded may be connected to the data transmission terminal 101 and the information read from the recording medium may be stored on the memory 131.

(Step S109)

After Step S108, the processor 111 classifies the sensor data excluding the changed data among the sensor data stored on the memory 131 as unchanged data. In a case in which the data transmission terminal 101 includes a plurality of sensors, the unchanged data are the sensor data output from the first sensor 141 that has output the changed data.

(Step S110)

After Step S109, the processor 111 transmits the sensor data and the changed data to the external terminal by using the communicator 121. At this time, the processor 111 transmits the sensor data acquired in Step S101 to the external terminal. The processor 111 transmits the changed data of which transmission has not been completed among the changed data stored on the memory 131 to the external terminal. In a case in which transmission of the changed data has been completed, the changed data are not transmitted.

(Step S111)

After Step S110, the processor 111 transmits the unchanged data to the external terminal by using the communicator 121. At this time, the processor 111 transmits the unchanged data of which transmission has not been completed among the unchanged data stored on the memory 131 to the external terminal. In a case in which transmission of the unchanged data has been completed, the unchanged data are not transmitted.

When the data transmission terminal 101 has a transmission opportunity, the data transmission terminal 101 transmits data in Step S110 and Step S111. When the other terminals are not wirelessly transmitting data, the data transmission terminal 101 can transmit data. Alternatively, in a time slot allocated to the data transmission terminal 101, the data transmission terminal 101 can transmit data. There is a case in which the data transmission terminal 101 is unable to complete transmission of the changed data or the unchanged data by the time the next sensor data acquisition (Step S101) is performed. After the next sensor data acquisition (Step S101) is performed, the data transmission terminal 101 transmits the sensor data that have not been transmitted.

The data transmission terminal 101 connects to the external terminal at a timing immediately after the timing at which the sensor data are acquired. The data transmission terminal 101 may connect to the external terminal at a timing other than this. For example, after the sensor data are stored on the memory 131 in Step S105, the data transmission terminal 101 may try to connect to the external terminal by the time the next sensor data are acquired. When a connection request is received from the external terminal at any timing, the data transmission terminal 101 may connect to the external terminal.

The data transmission terminal 101 may transmit the changed data to the external terminal in Step S110 after transmitting the acquired sensor data to the external terminal in Step S110. The data transmission terminal 101 may transmit the acquired sensor data to the external terminal in Step S110 after transmitting the changed data to the external terminal in Step S110.

Figure 3:
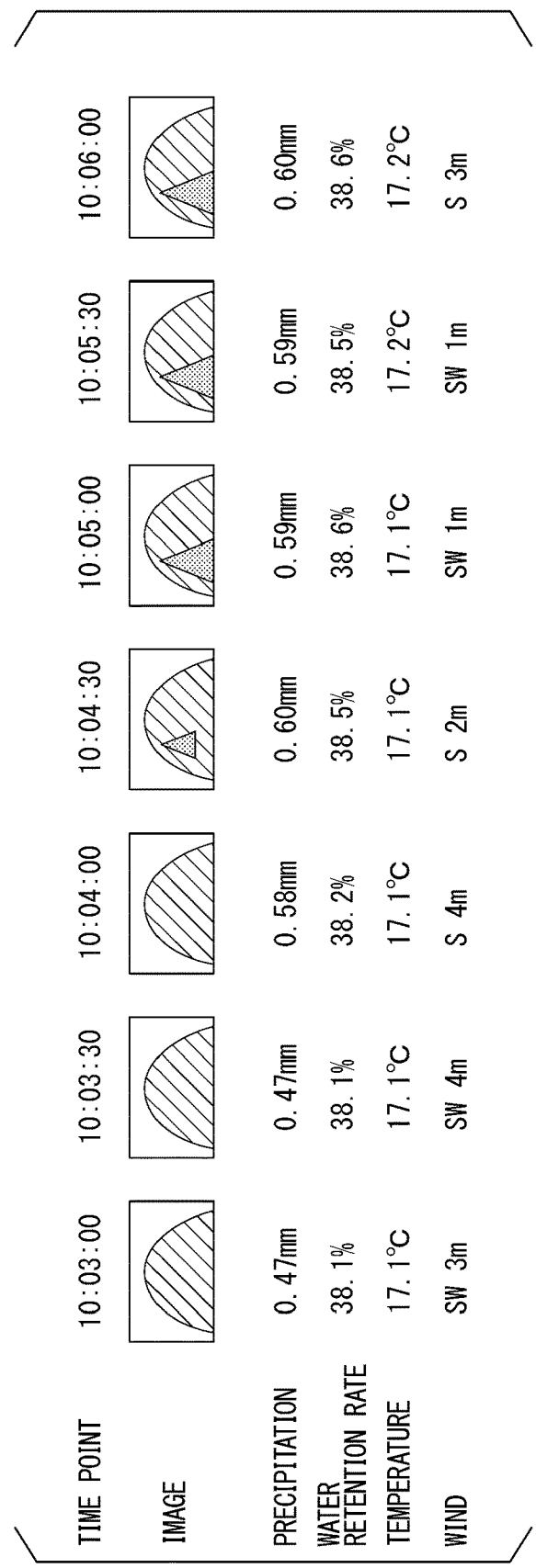
FIG. 3 is a diagram showing an example of sensor data in the first embodiment of the present invention.

FIG. 3 shows an example of sensor data. In the example shown in FIG. 3, sensor data of each of an image, precipitation, a water retention rate, temperature, and wind are shown. A time point at which each item is measured is also acquired. The time point may be replaced by the time and date. The precipitation data represent the precipitation per minute. The water retention rate data represent the water retention rate in soil. In the wind data, the south is represented as "S." In the wind data, the southwest is represented as "SW." In the example below, the content of processing will be described by using the types of sensor data shown in FIG. 3.

Figure 4:
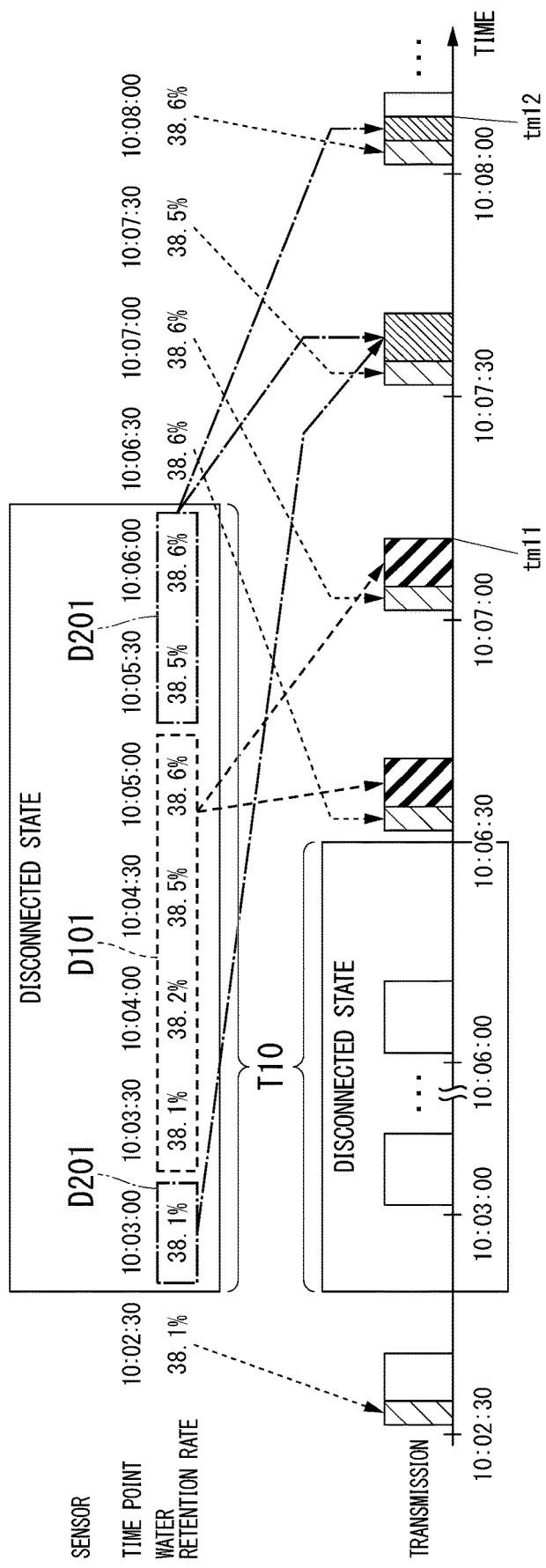
FIG. 4 is a diagram showing an example of communication in the first embodiment of the present invention.

FIG. 4 shows an example of communication of sensor data. An example in which the first sensor 141 acquires data (water-retention-rate data) of the water retention rate in soil will be described. The processor 111 acquires water-retention-rate data from the first sensor 141 (Step S101). A transmission period (transmission timing) is periodically allocated to the data transmission terminal 101. The data transmission terminal 101 transmits the water-retention-rate data to the external terminal in the transmission period.

At the time point 10:02:30, the communication state between the data transmission terminal 101 and the external terminal is the normal state (Step S102). The data transmission terminal 101 transmits the water-retention-rate data in soil acquired in Step S101 and the time point at which the water-retention-rate data are acquired to the external terminal (Step S110). This communication is performed in the transmission period allocated to the data transmission terminal 101. In the example shown in FIG. 4, the data transmission terminal 101 can transmit the water-retentionrate data in soil of one time and the time point at which the water-retention-rate data are acquired in a period that is one-third of the transmission period allocated to the data transmission terminal 101.

At the time point 10:03:00, the communication state between the data transmission terminal 101 and the external terminal is the disconnected state (Step S102). The data transmission terminal 101 tries to connect to the external terminal, but is unable to connect to the external terminal (Step S103 and Step S104). Therefore, the data transmission terminal 101 stores the water-retention-rate data acquired at the time point 10:03:00 on the memory 131 and stores the time point 10:03:00 on the memory 131 (Step S105).

The communication state between the data transmission terminal 101 and the external terminal is the disconnected state in a period T10. The water-retention-rate data acquired at the time point 10:03:00 to the time point 10:06:00 and the time point at which each piece of the water-retention-rate data is acquired are stored on the memory 131.

At the time point 10:06:30, the communication state between the data transmission terminal 101 and the external terminal is the disconnected state (Step S102).

The data transmission terminal 101 connects to the external terminal (Step S103 and Step S104). The water-retention-rate data acquired at the time point 10:03:00 to the time point 10:06:00 are stored on the memory 131 (Step S106). A change greater than or equal to the predetermined amount occurs between the water-retention-rate data acquired at the time point 10:04:00 and the water-retention-rate data acquired at the time point 10:04:30 (Step S107).

The data transmission terminal 101 classifies the water-retention-rate data acquired before and after the change greater than or equal to the predetermined amount as changed data D101 (Step S108). In this way, the water-retention-rate data acquired at the time point 10:03:30 to the time point 10:05:00 are classified as the changed data D101. The data transmission terminal 101 classifies the water-retention-rate data acquired at the time point other than the time point 10:03:30 to the time point 10:05:00 as unchanged data D201 (Step S109). In this way, the water-retention-rate data acquired at each of the time point 10:03:00, the time point 10:05:30, and the time point 10:06:00 are classified as the unchanged data D201.

In the above-described example, the predetermined amount used for determining the change of the water-retention-rate data is 0.3%. The changed data D101 are the water-retention-rate data acquired at each of the time point 10:03:30, the time point 10:04:00, the time point 10:04:30, and the time point 10:05:00. The water-retention-rate data at the time point 10:04:00 are acquired immediately before the change greater than or equal to the predetermined amount occurs. The water-retention-rate data at the time point 10:04:30 are acquired at the time point at which the change greater than or equal to the predetermined amount occurs. The water-retention-rate data at the time point 10:03:30 are sensor data preceding the water-retention-rate data at the time point 10:04:00. The water-retention-rate data at the time point 10:05:00 are sensor data following the water-retention-rate data at the time point 10:04:30.

The data transmission terminal 101 transmits the water-retention-rate data acquired at the time point 10:06:30 and the stored changed data D101 to the external terminal (Step S110). The data transmission terminal 101 can transmit the water-retention-rate data in soil of one time and the time point at which the water-retention-rate data are acquired in a period that is one-third of the transmission period. Therefore, the data transmission terminal 101 can transmit the water-retention-rate data of three times and the time points at which the water-retention-rate data are acquired in the transmission period of one time.

Specifically, the data transmission terminal 101 transmits the water-retention-rate data acquired at the time point 10:06:30 to the external terminal and transmits the time point 10:06:30 to the external terminal. At the time point 10:06:30, the changed data D101 acquired at the time point 10:03:30 to the time point 10:05:00 have not been transmitted. The data transmission terminal 101 transmits the changed data D101 acquired at each of the time point 10:03:30 and the time point 10:04:00 to the external terminal and transmits the time point at which each piece of the changed data D101 is acquired to the external terminal.

At the time point 10:07:00, the communication state between the data transmission terminal 101 and the external terminal is the normal state (Step S102). The data transmission terminal 101 transmits the water-retention-rate data acquired at the time point 10:07:00 to the external terminal and transmits the time point 10:07:00 to the external terminal (Step S110). At the time point 10:07:00, transmission of the changed data D101 acquired at each of the time point 10:04:30 and the time point 10:05:00 has not been completed. The data transmission terminal 101 transmits the changed data D101 acquired at each of the time point 10:04:30 and the time point 10:05:00 to the external terminal and transmits the time point at which each piece of the changed data D101 is acquired to the external terminal (Step S110). In this way, transmission of the changed data D101 stored on the memory 131 is completed (timing tm11).

At the time point 10:07:30, the communication state between the data transmission terminal 101 and the external terminal is the normal state (Step S102). The data transmission terminal 101 transmits the water-retention-rate data acquired at the time point 10:07:30 to the external terminal and transmits the time point 10:07:30 to the external terminal (Step S110). At the time point 10:07:30, transmission of the unchanged data D201 acquired at each of the time point 10:03:00, the time point 10:05:30, and the time point 10:06:00 has not been completed. The data transmission terminal 101 transmits the unchanged data D201 acquired at each of the time point 10:03:00 and the time point 10:05:30 to the external terminal and transmits the time point at which each piece of the unchanged data D201 is acquired to the external terminal (Step S111).

At the time point 10:08:00, the communication state between the data transmission terminal 101 and the external terminal is the normal state (Step S102). The data transmission terminal 101 transmits the water-retention-rate data acquired at the time point 10:08:00 to the external terminal and transmits the time point 10:08:00 to the external terminal (Step S110). At the time point 10:08:00, transmission of the unchanged data D201 acquired at the time point 10:06:00 has not been completed. The data transmission terminal 101 transmits the unchanged data D201 acquired at the time point 10:06:00 to the external terminal and transmits the time point 10:06:00 to the external terminal (Step S111). In this way, transmission of the unchanged data D201 stored on the memory 131 is completed (timing tm12).

When this transmission is completed, transmission of all pieces of changed data D101 and all pieces of unchanged data D201 has been completed. The data transmission terminal 101 executes transmission similar to that executed at the time point 10:02:30 in a transmission period after the time point 10:08:00. In other words, in the allocated transmission period, the data transmission terminal 101 transmits the water-retention-rate data acquired in Step S101 and the time point at which the water-retention-rate data are acquired to the external terminal (Step S110).

In the example shown in FIG. 4, the data transmission terminal 101 transmits multiple pieces of changed data D101 in the order in which each piece of changed data D101 is acquired. The data transmission terminal 101 does not need to transmit the multiple pieces of changed data D101 in the order in which each piece of changed data D101 is acquired.

In the example shown in FIG. 4, the data transmission terminal 101 transmits multiple pieces of unchanged data D201 in the order in which each piece of unchanged data D201 is acquired. The data transmission terminal 101 does not need to transmit the multiple pieces of unchanged data D201 in the order in which each piece of unchanged data D201 is acquired.

An example of the communication to which the wireless communication technology allocating a transmission timing to a terminal is applied is described above. In the communication to which the wireless communication technology (for example, IEEE802.11) in which each terminal acquires a transmission opportunity is applied, sensor data are transmitted similarly to the above-described example. This can also be applied to each embodiment described below.

A data transmission method according to each aspect of the present invention includes a first step, a second step, a third step, a fourth step, a fifth step, a sixth step, and a seventh step. The processor 111 transmits first sensor data output from the first sensor 141 to an external terminal by using the communicator 121 in the first step (Step S110). The processor 111 determines a state of communication between the communicator 121 and the external terminal in the second step (Step S102). When the processor 111 determines that the state of the communication has shifted from a normal state to a disconnected state, the processor 111 stores the first sensor data on the memory 131 in a time-series manner in the third step (Step S105).

When the processor 111 determines that the state of the communication has shifted from the disconnected state to the normal state, the processor 111 determines whether or not a change greater than or equal to a predetermined amount has occurred on the basis of multiple pieces of first sensor data stored on the memory 131 in the fourth step (Step S107). When the processor 111 determines that the change has occurred, the processor 111 classifies the multiple pieces of first sensor data stored on the memory 131 as changed data and unchanged data in the fifth step (Step S108 and Step S109). The processor 111 transmits the changed data to the external terminal by using the communicator 121 in the sixth step (Step S110). After the changed data are transmitted to the external terminal, the processor 111 transmits the unchanged data to the external terminal by using the communicator 121 in the seventh step (Step S111).

A data transmission method according to each aspect of the present invention may not include processing other than the processing corresponding to the above-described first to seventh steps.

When the data transmission terminal 101 having restrictions in communication is restored from the disconnected state, the data transmission terminal 101 can transmit sensor data required to be monitored to the external terminal with high priority. The data transmission terminal 101 can transmit the changed data that represent the change greater than or equal to the predetermined amount to the external terminal with high priority.

In a case in which the change greater than or equal to the predetermined amount occurs, there is a possibility that the change not reaching the predetermined amount occurs before or after the change greater than or equal to the predetermined amount occurs. There is a possibility that the unchanged data include information of such a small change. There is a possibility that a small change related to the change greater than or equal to the predetermined amount is detected in monitoring sensor data. When the data transmission terminal 101 having restrictions in communication is restored from the disconnected state, the data transmission terminal 101 can transmit sensor data for analyzing abnormalities in detail to the external terminal with high priority.

Second Embodiment

Figure 5:
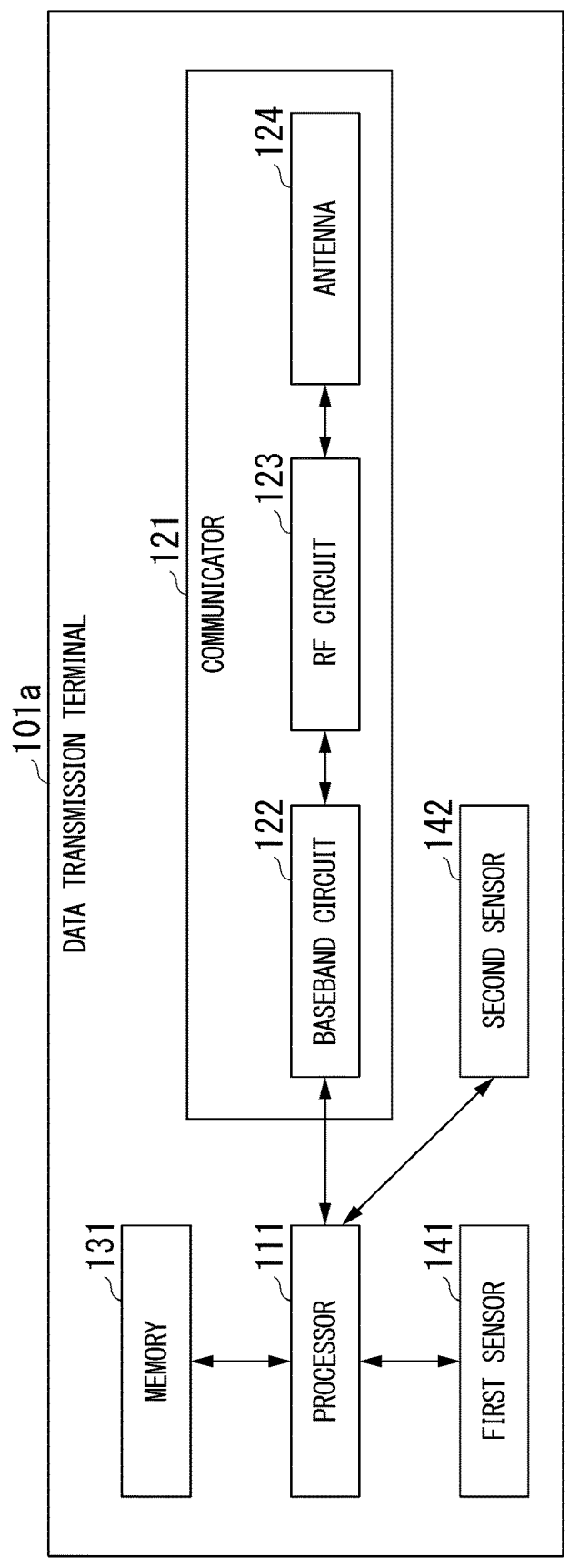
FIG. 5 is a block diagram showing a configuration of a data transmission terminal according to a second embodiment of the present invention.

FIG. 5 shows a configuration of a data transmission terminal 101a according to a second embodiment of the present invention. The same parts as those shown in FIG. 1 will not be described.

The data transmission terminal 101a includes a second sensor 142 in addition to the configuration shown in FIG. 1. The second sensor 142 is different from the first sensor 141. The processor 111 transmits second sensor data output from the second sensor 142 to an external terminal by using the communicator 121. When the processor 111 determines that the state of communication between the communicator 121 and the external terminal has shifted from a normal state to a disconnected state, the processor 111 stores the second sensor data on the memory 131 in a time-series manner. When the processor 111 determines that the state of the communication has shifted from the disconnected state to the normal state, the processor 111 determines whether or not a change greater than or equal to a predetermined amount has occurred on the basis of multiple pieces of first sensor data stored on the memory 131. When the processor 11 determines that the change has occurred, the processor 111 classifies multiple pieces of second sensor data stored on the memory 131 as related data and unrelated data. The related data are related to a period in which the change occurs and are output from the second sensor 142 in the period in which the change occurs. The unrelated data are not related to the period in which the change occurs and are output from the second sensor 142 in a period different from the period in which the change occurs. The processor 11 transmits the changed data and the related data to the external terminal by using the communicator 121. After the changed data and the related data are transmitted to the external terminal, the processor 111 transmits the unchanged data and the unrelated data to the external terminal by using the communicator 121.

The second sensor 142 is a sensor such as an image sensor or a weather sensor. The second sensor 142 measures a physical quantity of an object and generates second sensor data that represent a measurement result. The type of the second sensor data generated by the second sensor 142 is different from the type of the first sensor data generated by the first sensor 141. The second sensor 142 outputs the generated second sensor data to the processor 111. In the following descriptions, the second sensor data may be called sensor data. The data transmission terminal 101a may include three or more sensors including the first sensor 141 and the second sensor 142.

Figure 6:
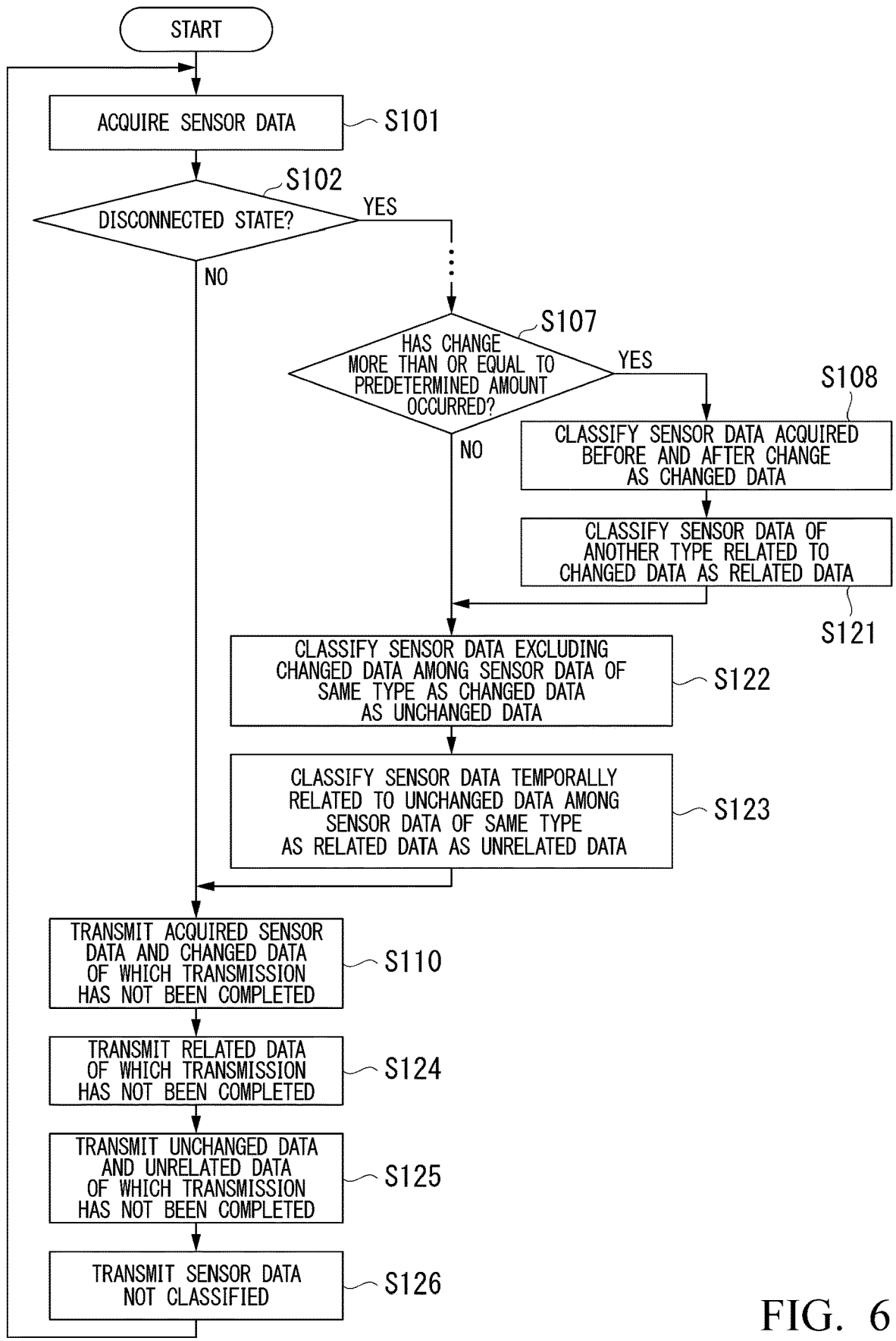
FIG. 6 is a flow chart showing a procedure of an operation of the data transmission terminal according to the second embodiment of the present invention.

An operation of the data transmission terminal 101a will be described. FIG. 6 shows a procedure of the operation of the data transmission terminal 101a. The same processing as the processing shown in FIG. 2 will not be described. FIG. 6 includes the processing from Step S103 to Step S106 shown in FIG. 2. In FIG. 6, the processing from Step S103 to Step S106 is not shown.

The processor 111 acquires sensor data from at least one of the first sensor 141 and the second sensor 142 in Step S101. The processor 111 determines whether or not a change greater than or equal to a predetermined amount has occurred on the basis of the sensor data acquired from the first sensor 141 in Step S107. When the processor 111 determines that the change greater than or equal to the predetermined amount has not occurred in Step S107, the processing in Step S122 is executed. Details of the processing in Step S122 will be described later.

(Step S121)

After Step S108, the processor 111 classifies the sensor data acquired from the second sensor 142 in the same period as the period in which the change in the sensor data of the first sensor 141 occurs as related data. The related data is temporally related to the changed data.

An example in which the sensor data shown in FIG. 3 are acquired and the communication state is a disconnected state in the same period as the period shown in FIG. 4 will be described. The processor 111 determines whether or not a change greater than or equal to a predetermined amount has occurred on the basis of the water retention amount. As with the example shown in FIG. 4, the changed data are the water retention amount at each of the time point 10:03:30, the time point 10:04:00, the time point 10:04:30, and the time point 10:05:00. The related data are the data acquired at the time point 10:03:30 to the time point 10:05:00 among the sensor data of an image, precipitation, temperature, or wind.

In the above-described example, the first period is the same as the second period. The first period is a period in which the changed data are acquired from the first sensor 141. The second period is a period in which the related data are acquired from the second sensor 142. The first period may include the second period and the first period may be longer than the second period. Alternatively, the second period may include the first period and the second period may be longer than the first period.

The processor 111 may classify the sensor data that are acquired in the same period as the period in which the change occurs and represent a physical quantity highly related to the physical quantity represented by the changed data as related data. In a case in which the sensor data shown in FIG. 3 are acquired, precipitation and an image are highly related to a water retention rate. In an example in which the communication state is a disconnected state in the same period as the period shown in FIG. 4, the processor 111 classifies the precipitation data acquired at the time point 10:03:30 to the time point 10:05:00 and the image data acquired at the time point 10:03:30 to the time point 10:05:00 as related data. The processor 111 may not classify the data acquired at the time point 10:03:30 to the time point 10:05:00 as related data regarding temperature and wind.

For example, information that represents the relevance between multiple pieces of sensor data are stored on the memory 131 in advance. The relevance may be set through a user's operation of an operation unit not shown in the drawing. The communicator 121 may receive information that represents the relevance from the external terminal and the received information may be stored on the memory 131. Information that represents the relevance may be received from the external terminal through communication using another communicator not shown in the drawing and the received information may be stored on the memory 131. A recording medium on which information that represents the relevance is recorded may be connected to the data transmission terminal 101a and the information read from the recording medium may be stored on the memory 131.

The relevance between multiple pieces of sensor data may be set in accordance with objectives of performing monitoring in the data transmission terminal 101a. For example, in a case in which the objective is monitoring a landslide, the relevance between precipitation and a water retention rate may be set to be high. The processor 111 may learn the relevance between multiple pieces of sensor data on the basis of the sensor data acquired in the past and may set the relevance by using the learning result.

(Step S122)

After Step S121, the processor 111 classifies the sensor data excluding changed data among the sensor data of the same type as the changed data as unchanged data. The unchanged data are only the sensor data of the same type as the changed data. For example, in a case in which the changed data are water-retention-rate data, the unchanged data are only the sensor data that are not the changed data among the stored water-retention-rate data. Sensor data such as data of precipitation and temperature are not included in the unchanged data.

(Step S123)

After Step S122, the processor 111 classifies the sensor data acquired in the same period as the period in which the unchanged data are acquired among the sensor data acquired from the second sensor 142 as unrelated data. The unrelated data are temporally related to the unchanged data. The processor 111 may classify the sensor data that are acquired in the same period as the period in which the unchanged data are acquired and represent a physical quantity highly related to the physical quantity represented by the unchanged data among multiple types of sensor data as the unrelated data. After Step S123, the processing in Step S110 is executed.

In the above-described example, the third period is the same as the fourth period. The third period is a period in which the unchanged data are acquired from the first sensor 141. The fourth period is a period in which the unrelated data are acquired from the second sensor 142. The third period may include the fourth period and the third period may be longer than the fourth period. Alternatively, the fourth period may include the third period and the fourth period may be longer than the third period.

(Step S124)

After Step S110, the processor 111 transmits the related data to the external terminal by using the communicator 121. At this time, the processor 111 transmits the related data of which transmission has not been completed among the related data stored on the memory 131 to the external terminal. In a case in which transmission of the related data has been completed, the related data are not transmitted.

(Step S125)

After Step S124, the processor 111 transmits the unchanged data and the unrelated data to the external terminal by using the communicator 121. At this time, the processor 111 transmits the unchanged data of which transmission has not been completed among the unchanged data stored on the memory 131 to the external terminal. The processor 111 transmits the unrelated data of which transmission has not been completed among the unrelated data stored on the memory 131 to the external terminal. The processor 111 may transmit the unrelated data to the external terminal after transmitting the unchanged data to the external terminal. The processor 111 may transmit the unchanged data to the external terminal after transmitting the unrelated data to the external terminal. In a case in which transmission of the unchanged data has been completed, the unchanged data are not transmitted. In a case in which transmission of the unrelated data has been completed, the unrelated data are not transmitted.
(Step S126)

After Step S125, the processor 111 transmits the sensor data not classified to the external terminal by using the communicator 121. At this time, the processor 111 transmits the sensor data of which transmission has not been completed among the sensor data not classified and stored on the memory 131 to the external terminal. The sensor data not classified are different from any piece of the changed data, the related data, the unchanged data, and the unrelated data.

When the data transmission terminal 101a has a transmission opportunity, the data transmission terminal 101a transmits data in Step S110, Step S124, Step S125, and Step S126. When the other terminals are not wirelessly transmitting data, the data transmission terminal 101a can transmit data. Alternatively, in a time slot allocated to the data transmission terminal 101a, the data transmission terminal 101a can transmit data. There is a case in which the data transmission terminal 101a is unable to complete transmission of each piece of data by the time the next sensor data acquisition (Step S101) is performed. After the next sensor data acquisition (Step S101) is performed, the data transmission terminal 101a transmits the sensor data that have not been transmitted.

In the example shown in FIG. 6, the data transmission terminal 101a transmits the related data to the external terminal in Step S124 after transmitting the changed data to the external terminal in Step S110. The data transmission terminal 101a may transmit the changed data to the external terminal in Step S10 after transmitting the related data to the external terminal in Step S124.

The data transmission terminal 101a may transmit the changed data to the external terminal in Step S110 after transmitting the acquired sensor data to the external terminal in Step S110. The data transmission terminal 101a may transmit the acquired sensor data to the external terminal in Step S110 after transmitting the changed data to the external terminal in Step S110.

The data transmission terminal 101a may transmit the unrelated data to the external terminal in Step S125 after transmitting the unchanged data to the external terminal in Step S125. The data transmission terminal 101a may transmit the unchanged data to the external terminal in Step S125 after transmitting the unrelated data to the external terminal in Step S125.

Figure 7:
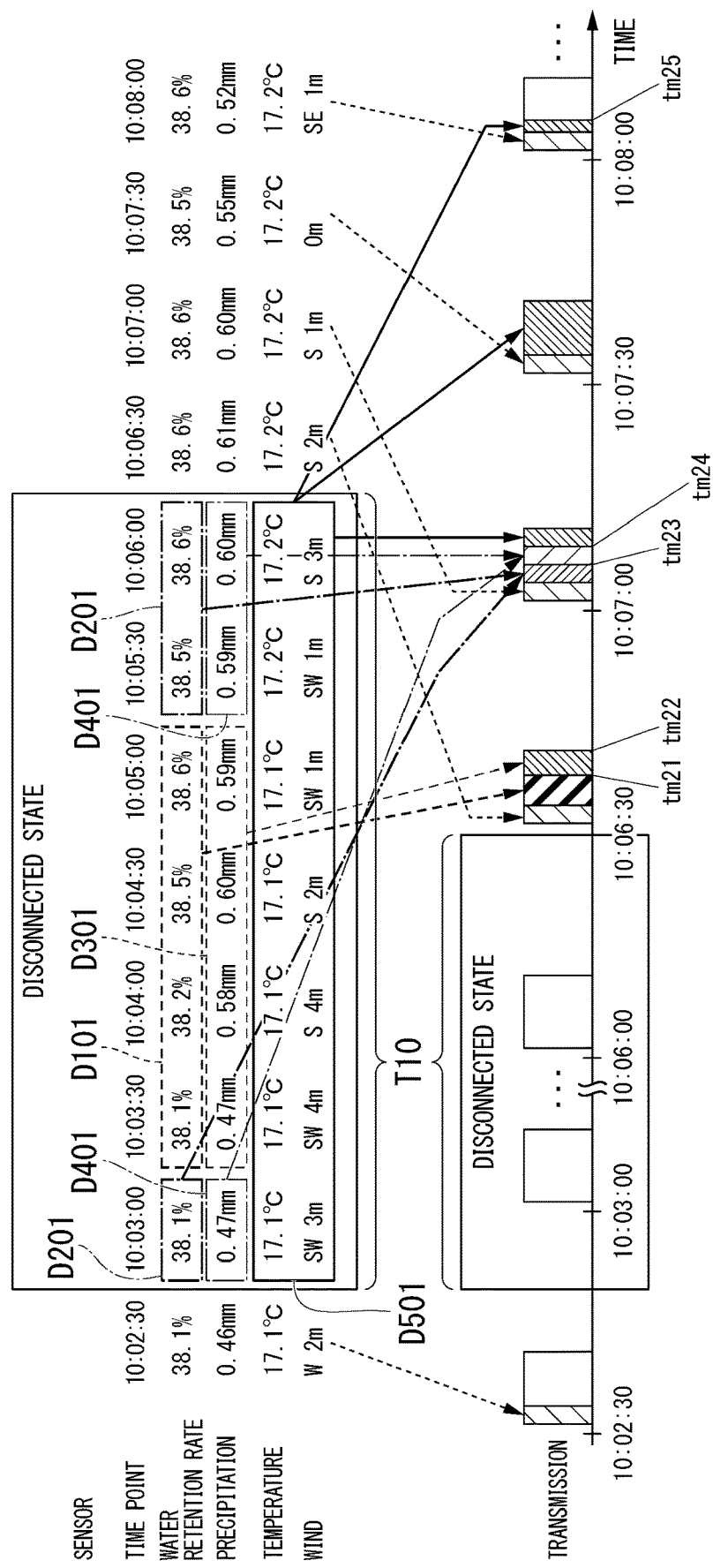
FIG. 7 is a diagram showing an example of communication in the second embodiment of the present invention.

FIG. 7 shows an example of communication of sensor data. An example in which the data transmission terminal 101a includes a plurality of sensors, the first sensor 141 acquires water-retention-rate data in soil, and the second sensor 142 acquires precipitation data will be described. The sensor excluding the first sensor 141 and the second sensor 142 acquires temperature data or wind data. The precipitation data represent the precipitation per minute. In the wind data, the west is represented as "W." In the wind data, the south is represented as "S." In the wind data, the southwest is represented as "SW." In the wind data, the southeast is represented as "SE." The processor 111 acquires sensor data from each sensor (Step S101).

In the example shown in FIG. 7, the data transmission terminal 101a can transmit the sensor data of one time and the time point at which the sensor data are acquired in a period that is one-fourth of the transmission period allocated to the data transmission terminal 101a. The data transmission terminal 101a transmits the sensor data of each of a water-retention-rate, precipitation, temperature, and wind to the external terminal in this period. The data transmission terminal 101a transmits the time point to the external terminal in this period. Since time points at which multiple pieces of sensor data are acquired are the same, the data transmission terminal 101a transmits the time point in common between the multiple pieces of sensor data to the external terminal.

The communication state between the data transmission terminal 101a and the external terminal is the disconnected state in a period T10. The sensor data acquired at the time point 10:00:30 to the time point 10:06:00 and the time point at which each piece of the sensor data is acquired are stored on the memory 131.

At the time point 10:06:30, the communication state between the data transmission terminal 101a and the external terminal is the disconnected state (Step S102). The data transmission terminal 101a connects to the external terminal (Step S103 and Step S104). The sensor data acquired at the time point 10:03:00 to the time point 10:06:00 are stored on the memory 131 (Step S106). A change greater than or equal to the predetermined amount occurs between the water-retention-rate data acquired at the time point 10:04:00 and the water-retention-rate data acquired at the time point 10:04:30 (Step S107).

The data transmission terminal 101a classifies the water-retention-rate data acquired before and after the change greater than or equal to the predetermined amount as changed data D101 (Step S108). In this way, the water-retention-rate data acquired at the time point 10:03:30 to the time point 10:05:00 are classified as the changed data D101. The data transmission terminal 101a classifies the precipitation data acquired at the time point 10:03:30 to the time point 10:05:00 and highly related to the water retention rate as related data D301 (Step S121). The data transmission terminal 101a classifies the water-retention-rate data acquired at the time point other than the time point 10:03:30 to the time point 10:05:00 as unchanged data D201 (Step S122). In this way, the water-retention-rate data acquired at each of the time point 10:03:00, the time point 10:05:30, and the time point 10:06:00 are classified as the unchanged data D201.

The data transmission terminal 101a classifies the precipitation data acquired at the same time point as the time point at which the unchanged data D201 are acquired as unrelated data D401 (Step S123). In this way, the precipitation data acquired at each of the time point 10:03:00, the time point 10:05:30, and the time point 10:06:00 are classified as the unrelated data D401.

The data transmission terminal 101a transmits the sensor data acquired at the time point 10:06:30 and the stored changed data D101 to the external terminal (Step S110). Specifically, the data transmission terminal 101a transmits the sensor data of each of the water-retention-rate, precipitation, temperature, and the wind to the external terminal and transmits the time point to the external terminal. At the time point 10:06:30, the changed data D101 acquired at the time point 10:03:30 to the time point 10:05:00 have not been transmitted. The data transmission terminal 101a transmits the changed data D101 acquired at each of the time point 10:03:30 to the time point 10:05:00 to the external terminal and transmits the time point at which each piece of the changed data D101 is acquired to the external terminal. In this way, transmission of the changed data D101 stored on the memory 131 is completed (timing tm21).

When transmission of the changed data D101 is completed, the transmission period allocated to the data transmission terminal 101a still has some time to spare. Therefore, the data transmission terminal 101*a* transmits the related data D301 acquired at each of the time point 10:03:30 to the time point 10:05:00 to the external terminal and transmits the time point at which each piece of the related data D301 is acquired to the external terminal (Step S124) following the transmission of the changed data D101 and the time point. In this way, transmission of the related data D301 stored on the memory 131 is completed (timing tm22). When the related data D301 acquired at each time point is transmitted, the transmission period is completed.

At the time point 10:07:00, the communication state between the data transmission terminal 101*a* and the external terminal is the normal state (Step S102). The data transmission terminal 101*a* transmits the water-retention-rate data, precipitation data, temperature data, and the wind data acquired at the time point 10:07:00 to the external terminal and transmits the time point 10:07:00 to the external terminal (Step S110). At the time point 10:07:00, transmission of the changed data D101 and the related data D301 has been completed. At the time point 10:07:00, transmission of the unchanged data D201 acquired at each of the time point 10:03:00, the time point 10:05:30 and the time point 10:06:00 has not been completed. The data transmission terminal 101*a* transmits the unchanged data D201 acquired at each of the time point 10:03:00, the time point 10:05:30 and the time point 10:06:00 to the external terminal and transmits the time point at which each piece of the unchanged data D201 is acquired to the external terminal (Step S125). In this way, transmission of the unchanged data D201 stored on the memory 131 is completed (timing tm23).

At the time point 10:07:00, transmission of the unrelated data D401 acquired at each of the time point 10:03:00, the time point 10:05:30 and the time point 10:06:00 has not been completed. The data transmission terminal 101*a* transmits the unrelated data D401 acquired at each of the time point 10:03:00, the time point 10:05:30 and the time point 10:06:00 to the external terminal and transmits the time point at which each piece of the unrelated data D401 is acquired to the external terminal (Step S125) following the transmission of the unchanged data D201 and the time point. In this way, transmission of the unrelated data D401 stored on the memory 131 is completed (timing tm24).

At the time point 10:07:00, transmission of the temperature data acquired at the time point 10:03:00 to the time point 10:06:00 and the wind data acquired at the time point 10:03:00 to the time point 10:06:00 has not been completed. The temperature data and the wind data are shown as unclassified data D501 in FIG. 7. When transmission of the unrelated data D401 is completed, the transmission period allocated to the data transmission terminal 101*a* still has some time to spare. Therefore, the data transmission terminal 101*a* transmits the unclassified data D501 acquired at the time point 10:03:00 to the external terminal and transmits the time point 10:03:00 to the external terminal (Step S126) following the transmission of the unrelated data D401 and the time point. When the unclassified data D501 acquired at the time point 10:03:00 is transmitted, the transmission period is completed.

At the time point 10:07:30, the communication state between the data transmission terminal 101*a* and the external terminal is the normal state (Step S102). The data transmission terminal 101*a* transmits the water-retention-rate data, precipitation data, temperature data, and the wind data acquired at the time point 10:07:30 to the external terminal and transmits the time point 10:07:30 to the external terminal (Step S110). At the time point 10:07:30, transmission of the changed data D101, the related data D301, the unchanged data D201, and the unrelated data D401 has been completed. At the time point 10:07:30, transmission of the unclassified data D501 acquired at the time point 10:03:30 to the time point 10:06:00 has not been completed. The data transmission terminal 101*a* transmits the unclassified data D501 acquired at each of the time point 10:03:30 to the time point 10:05:30 to the external terminal and transmits the time point at which each piece of the unclassified data D501 is acquired to the external terminal (Step S126). When the unclassified data D501 acquired at the time point 10:05:30 is transmitted, the transmission period is completed.

At the time point 10:08:00, the communication state between the data transmission terminal 101*a* and the external terminal is the normal state (Step S02). The data transmission terminal 101*a* transmits the water-retention-rate data, precipitation data, temperature data, and the wind data acquired at the time point 10:08:00 to the external terminal and transmits the time point 10:08:00 to the external terminal (Step S110). At the time point 10:08:00, transmission of the changed data D101, the related data D301, the unchanged data D201, and the unrelated data D401 has been completed. At the time point 10:08:00, transmission of the unclassified data D501 acquired at the time point 10:06:00 has not been completed. The data transmission terminal 101*a* transmits the unclassified data D501 acquired at the time point 10:06:00 to the external terminal and transmits the time point 10:06:00 to the external terminal (Step S126). In this way, transmission of the unclassified data D501 stored on the memory 131 is completed (timing tm25).

When this transmission is completed, transmission of all pieces of changed data D101, all pieces of related data D301, all pieces of unchanged data D201, all pieces of unrelated data D401, and all pieces of unclassified data D501 has been completed. The data transmission terminal 101*a* executes transmission similar to that executed at the time point 10:02:30 in a transmission period after the time point 10:08:00. In other words, in the allocated transmission period, the data transmission terminal 101*a* transmits sensor data of each of the water-retention-rate, precipitation, temperature, and the wind to the external terminal and transmits the time point to the external terminal (Step S110).

The data transmission terminal 101*a* does not need to transmit the multiple pieces of changed data D101 in the order in which each piece of changed data D101 is acquired. The data transmission terminal 101*a* does not need to transmit the multiple pieces of unchanged data D201 in the order in which each piece of unchanged data D201 is acquired.

In the example shown in FIG. 7, the data transmission terminal 101*a* transmits multiple pieces of related data D301 in the order in which each piece of related data D301 is acquired. The data transmission terminal 101*a* does not need to transmit the multiple pieces of related data D301 in the order in which each piece of related data D301 is acquired.

In the example shown in FIG. 7, the data transmission terminal 101*a* transmits multiple pieces of unclassified data D501 in the order in which each piece of unclassified data D501 is acquired. The data transmission terminal 101*a* does not need to transmit the multiple pieces of unclassified data D501 in the order in which each piece of unclassified data D501 is acquired.

In the example shown in FIG. 7, the data transmission terminal 101*a* transmits multiple pieces of unrelated data D401 in the order in which each piece of unrelated data D401 is acquired. The data transmission terminal 101*a* does not need to transmit the multiple pieces of unrelated data D401 in the order in which each piece of unrelated data D401 is acquired.

In the second embodiment, the processor 111 transmits the second sensor data output from the second sensor 142 to the external terminal by using the communicator 121 in Step S110. When the processor 111 determines that the state of communication between the communicator 121 and the external terminal has shifted from the normal state to the disconnected state, the processor 111 stores the second sensor data on the memory 131 in a time-series manner in Step S105. When the processor 111 determines that the change greater than or equal to the predetermined amount has occurred, the processor 111 classifies multiple pieces of second sensor data stored on the memory 131 as the related data and the unrelated data in Step S121 and Step S123. The processor 111 transmits the changed data and the related data to the external terminal by using the communicator 121 in Step S110 and Step S124. After the changed data and the related data are transmitted to the external terminal, the processor 111 transmits the unchanged data and the unrelated data to the external terminal by using the communicator 121 in Step S125.

When the data transmission terminal 101a having restrictions in communication is restored from the disconnected state, the data transmission terminal 101a can transmit sensor data required to be monitored to the external terminal with high priority. The data transmission terminal 101a can transmit the related data related to the change greater than or equal to the predetermined amount to the external terminal with high priority.

In a case in which the change greater than or equal to the predetermined amount occurs, there is a possibility that the change not reaching the predetermined amount occurs before or after the change greater than or equal to the predetermined amount occurs. There is a possibility that the unchanged data include information of such a small change. There is a possibility that the small change related to the change greater than or equal to the predetermined amount is detected in monitoring sensor data. There is a possibility that the unrelated data include information related to such a small change. When the data transmission terminal 101a having restrictions in communication is restored from the disconnected state, the data transmission terminal 101a can transmit sensor data for analyzing abnormalities in detail to the external terminal with high priority.

Third Embodiment

A third embodiment of the present invention will be described by using the data transmission terminal 101 shown in FIG. 1.

The processor 111 generates processed data by processing first sensor data. When the processor 111 determines that the state of communication between the communicator 121 and an external terminal has shifted from a disconnected state to a normal state, the processor 111 transmits the processed data to the external terminal by using the communicator 121. After the processed data are transmitted to the external terminal, the processor 111 transmits unchanged data to the external terminal by using the communicator 121.

For example, the processor 111 generates the processed data by processing the first sensor data output from the first sensor 141. When the processor 111 determines that the state of the communication has shifted from the normal state to the disconnected state, the processor 111 stores the first sensor data and the processed data on the memory 131.

Alternatively, when the processor 111 determines that the state of the communication has shifted from the normal state to the disconnected state, the processor 111 stores the first sensor data on the memory 131. The processor 111 generates the processed data by processing the first sensor data stored on the memory 131. The memory 131 may store the processed data in addition to the first sensor data. The processor 111 may generate the processed data by processing changed data.

Figure 8:
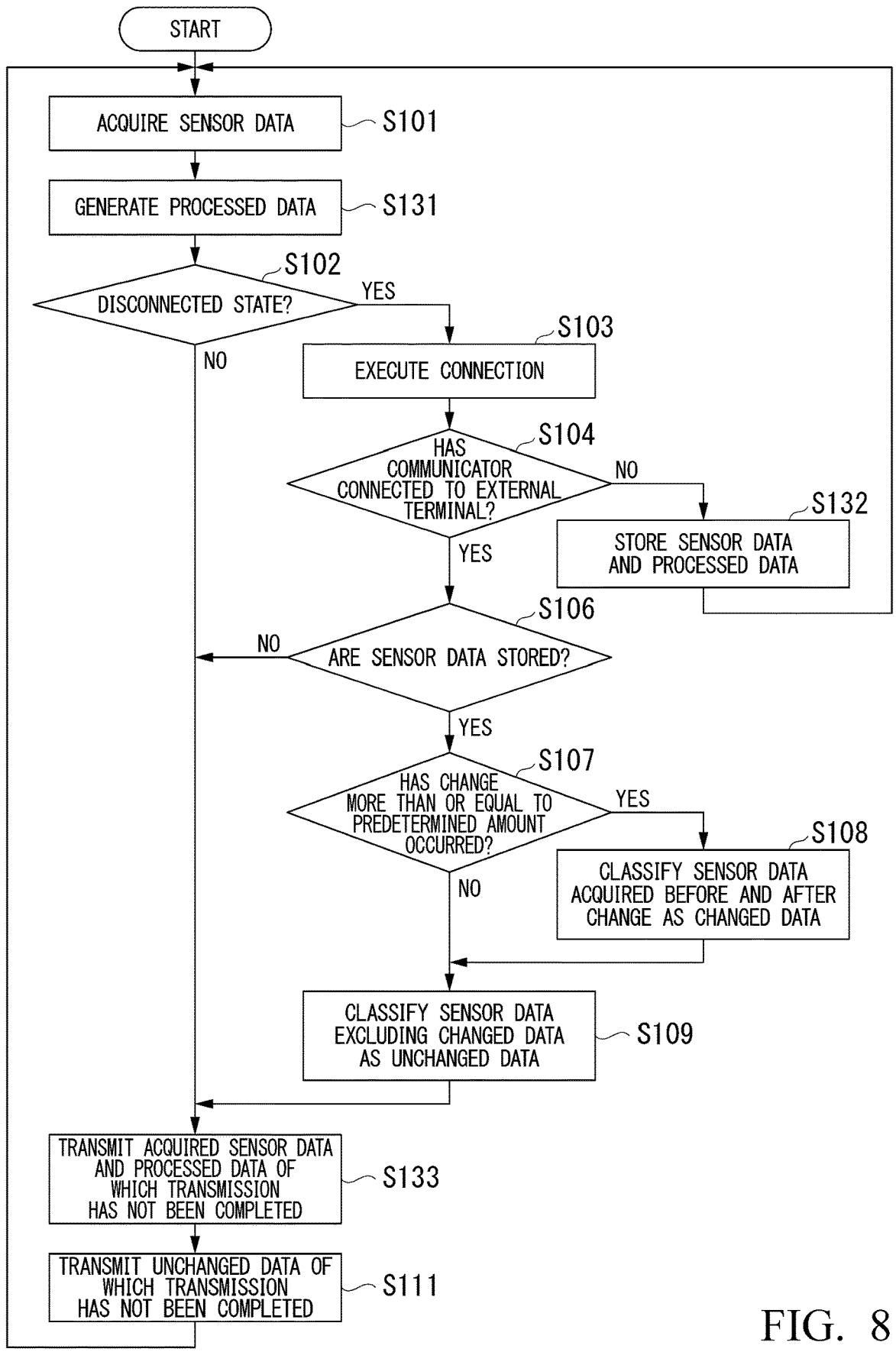
FIG. 8 is a flow chart showing a procedure of an operation of a data transmission terminal according to a third embodiment of the present invention.

An operation of the data transmission terminal 101 will be described. FIG. 8 shows a procedure of the operation of the data transmission terminal 101. The same processing as the processing shown in FIG. 2 will not be described.
(Step S131)

After Step S101, the processor 111 generates processed data by processing the sensor data acquired in Step S101. For example, in a case in which the sensor data are image data, the processor 111 calculates a ratio of each color in the image data. The processor 111 generates the processed data including the calculated ratio of each color. The processor 111 may generate the processed data by extracting data of a predetermined region from the image data. For example, the predetermined region includes the center of the image. The processor 111 may generate the processed data by decreasing the resolution of the image data.

The processor 111 does not need to generate the processed data each time the sensor data are acquired. The processor 111 may generate the processed data each time the sensor data are acquired only when the communication state is the disconnected state. After the processor 111 determines that the change greater than or equal to the predetermined amount has occurred, the processor 111 may generate the processed data. In such a case, the processor 111 may generate the processed data of the entire period in which the communication state is the disconnected state on the basis of the sensor data stored on the memory 131. Alternatively, the processor 111 may generate the processed data of the period in which the sensor data classified as the changed data are acquired on the basis of the sensor data stored on the memory 131.

The processor 111 may generate first processed data on the basis of the sensor data of the same type as the changed data and may generate second processed data on the basis of the sensor data of the different type from the changed data. For example, in a case in which the data transmission terminal 101a shown in FIG. 5 is used, the processor 111 may generate the first processed data on the basis of the first sensor data and may generate the second processed data on the basis of the second sensor data. For example, in a case in which the first sensor data are image data and the second sensor data are audio data, the processor 111 may generate the first processed data on the basis of the image data and may generate the second processed data on the basis of the audio data. For example, the processor 111 may generate the second processed data by extracting data of which the sound volume is greater than or equal to a predetermined amount from the audio data. The processor 111 may generate the second processed data by extracting bass data from the audio data. The processor 111 may generate the first processed data on the basis of the changed data and may generate the second processed data on the basis of the related data.
(Step S132)

When the processor 111 determines that the communicator 121 has not connected to the external terminal in Step S104, the processor 111 stores the sensor data acquired in Step S101 on the memory 131 and stores the processed data generated in Step S131 on the memory 131. Time point information is attached to the processed data. The time point information represents a time point at which the processed data are generated. The time point information may represent the same time point as the time point at which the sensor data are acquired. The memory 131 stores the processed data in a time-series manner. In other words, the memory 131 stores the processed data in accordance with the order in which the processed data are generated. The processor 111 identifies the order of the processed data on the basis of the time point information. After Step S132, the processing in Step S101 is executed.

(Step S133)

After Step S109, the processor 111 transmits the sensor data and the processed data to the external terminal by using the communicator 121. At this time, the processor 111 transmits the sensor data acquired in Step S101 to the external terminal. The processor 111 transmits the processed data of which transmission has not been completed among the processed data stored on the memory 131 to the external terminal. In a case in which transmission of the processed data has been completed, the processed data are not transmitted. After Step S133, the processing in Step S111 is executed.

When the data transmission terminal 101 has a transmission opportunity, the data transmission terminal 101 transmits data in Step S133 and Step S1. When the other terminals are not wirelessly transmitting data, the data transmission terminal 101 can transmit data. Alternatively, in a time slot allocated to the data transmission terminal 101, the data transmission terminal 101 can transmit data. There is a case in which the data transmission terminal 101 is unable to complete transmission of each piece of data by the time the next sensor data acquisition (Step S101) is performed. After the next sensor data acquisition (Step S101) is performed, the data transmission terminal 101 transmits the sensor data that have not been transmitted.

After the processor 111 determines that the change greater than or equal to the predetermined amount has occurred, the processor 111 may generate the processed data. In such a case, the processor 111 stores only the sensor data on the memory 131 in Step S132. After Step S108, the processor 111 may generate the processed data by processing the changed data stored on the memory 131.

In the example shown in FIG. 8, the processor 111 does not transmit the changed data to the external terminal. When the processor 111 determines that the state of the communication has shifted from the disconnected state to the normal state and the processor 111 determines that the change greater than or equal to the predetermined amount has occurred, the processor 111 may transmit the processed data and the unchanged data to the external terminal by using the communicator 121. After the processed data and the unchanged data are transmitted to the external terminal, the processor 111 may transmit the changed data to the external terminal by using the communicator 121.

The data transmission terminal 101 may transmit the processed data to the external terminal in Step S133 after transmitting the acquired sensor data to the external terminal in Step S133. The data transmission terminal 101 may transmit the acquired sensor data to the external terminal in Step S133 after transmitting the processed data to the external terminal in Step S133.

Figure 9:
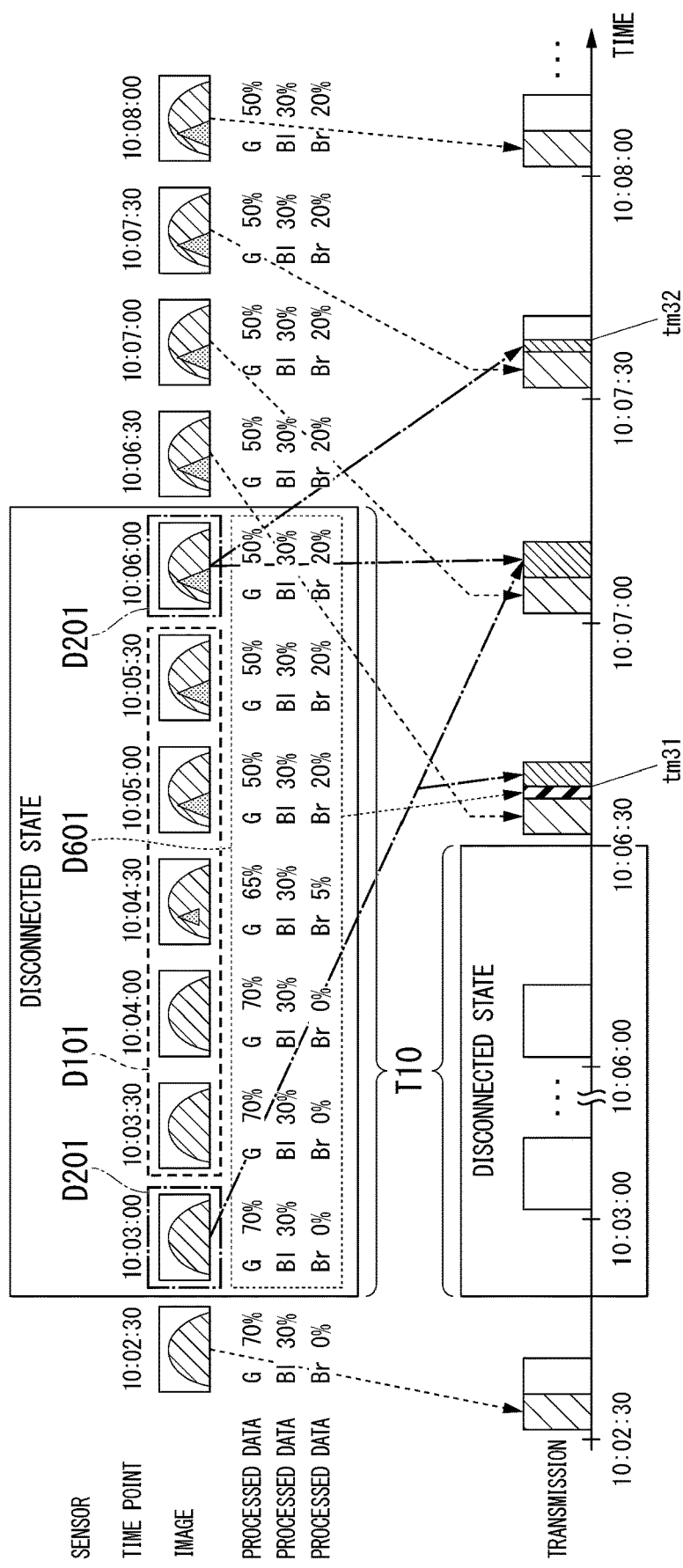
FIG. 9 is a diagram showing an example of communication in the third embodiment of the present invention.

FIG. 9 shows an example of communication of sensor data. An example in which the first sensor 141 acquires image data will be described. The processor 111 acquires image data from the first sensor 141 (Step S101).

The processor 111 generates processed data each time the image data are acquired (Step S131). The processed data represent a ratio (area ratio) of each color in the image data. Green is shown as "G" in the processed data. Light blue is shown as "Bl" in the processed data. Brown is shown as "Br" in the processed data.

At the time point 10:02:30, the communication state between the data transmission terminal 101 and the external terminal is the normal state (Step S102). The data transmission terminal 101 transmits the image data of one time acquired in Step S101 and the time point at which the image data are acquired to the external terminal (Step S133). This communication is performed in the transmission period allocated to the data transmission terminal 101. In the example shown in FIG. 9, the data transmission terminal 101 can transmit the image data of one time and the time point at which the image data are acquired in a period that is half the transmission period allocated to the data transmission terminal 101.

At the time point 10:03:0), the communication state between the data transmission terminal 101 and the external terminal is the disconnected state (Step S102). The data transmission terminal 101 tries to connect to the external terminal, but is unable to connect to the external terminal (Step S103 and Step S104). Therefore, the data transmission terminal 101 stores the image data acquired at the time point 10:03:0) on the memory 131 and stores the time point 10:03:00 on the memory 131 (Step S132). The data transmission terminal 101 further stores the processed data and the time point at which the processed data are generated on the memory 131 (Step S132).

The communication state between the data transmission terminal 101 and the external terminal is the disconnected state in a period T10. The image data, the processed data, and the time point are stored on the memory 131 at the time point 10:03:00 to the time point 10:06:00.

At the time point 10:06:30, the communication state between the data transmission terminal 101 and the external terminal is the disconnected state (Step S102). The data transmission terminal 101 connects to the external terminal (Step S103 and Step S104). The image data acquired at the time point 10:03:00 to the time point 10:0:00 are stored on the memory 131 (Step S106). A change greater than or equal to the predetermined amount occurs between the image data acquired at the time point 10:0400 and the image data acquired at the time point 10:04:30 and the change greater than or equal to the predetermined amount occurs between the image data acquired at the time point 10:04:30 and the image data acquired at the time point 10:05:00 (Step S107). In the example shown in FIG. 9, the change greater than or equal to the predetermined amount is detected when the ratio of at least one color in the image data changes by 5% or greater.

The data transmission terminal 101 classifies the image data acquired before and after the change greater than or equal to the predetermined amount as changed data D101 (Step S108). In this way, the image data acquired at the time point 10:03:30 to the time point 10:05:30 are classified as the changed data D101. The data transmission terminal 101 classifies the image data acquired at the time point other than the time point 10:03:30 to the time point 10:05:30 as unchanged data D201 (Step S109). In this way, the image data acquired at each of the time point 10:03:0) and the time point 10:06:00 are classified as the unchanged data D201.

The data transmission terminal 101 transmits the sensor data acquired at the time point 10:00:30 and the stored processed data D601 to the external terminal (Step S133).

Specifically, the data transmission terminal 101 transmits the sensor data acquired at the time point 10:0:30 to the external terminal and transmits the time point 10:06:30 to the external terminal. At the time point 10:06:30, the processed data D601 generated at the time point 10:03:00 to the time point 10:06:00 have not been transmitted. The data transmission terminal 101 transmits the processed data D601 generated at each of the time point 10:03:0) to the time point 10:06:00 to the external terminal and transmits the time point at which each piece of the processed data D601 is generated to the external terminal. In this way, transmission of the processed data D601 stored on the memory 131 is completed (timing tm31).

The size of the processed data is smaller than the size of the image data. When transmission of the processed data D601 is completed, the transmission period allocated to the data transmission terminal 101 still has some time to spare. Therefore, the data transmission terminal 101 transmits the unchanged data D201 acquired at the time point 10:03:00 to the external terminal (Step S111) following the transmission of the processed data D601 and the time point. When part of the unchanged data D201 acquired at the time point 10:0300 is transmitted, the transmission period is completed.

At the time point 10:07:00, the communication state between the data transmission terminal 101 and the external terminal is the normal state (Step S102). The data transmission terminal 101 transmits the image data acquired at the time point 10:07:0 to the external terminal and transmits the time point 10:07:00 to the external terminal (Step S133). At the time point 10:07:00, transmission of the processed data D601 has been completed. At the time point 10:07:00, transmission of the unchanged data D201 acquired at each of the time point 10:03:00 and the time point 10:06:00 has not been completed. The data transmission terminal 101 transmits the unchanged data D201 acquired at each of the time point 10:03:00 and the time point 10:06:00 to the external terminal and transmits the time point at which each piece of the unchanged data D201 is acquired to the external terminal (Step S111). When pan of the unchanged data D201 acquired at the time point 10:06:00 is transmitted, the transmission period is completed. The time point 10:06:00 is not transmitted.

At the time point 10:07:30, the communication state between the data transmission terminal 101 and the external terminal is the normal state (Step S102). The data transmission terminal 101 transmits the image data acquired at the time point 10:07:30 to the external terminal and transmits the time point 10:07:30 to the external terminal (Step S133). At the time point 10:07:30, transmission of part of the unchanged data D201 acquired at the time point 10:06:00 has not been completed. The data transmission terminal 101 transmits the part of the unchanged data D201 acquired at the time point 10:06:00 to the external terminal and transmits the time point 10:06:00 to the external terminal (Step S111).

When this transmission is completed, transmission of all pieces of processed data D601 and all pieces of unchanged data D201 has been completed. The data transmission terminal 101 executes transmission similar to that executed at the time point 10:02:30 in a transmission period after the time point 10:07:30. In other words, in the allocated transmission period, the data transmission terminal 101 transmits the image data acquired in Step S101 and the time point at which the image data are acquired to the external terminal (Step S133).

The data transmission terminal 101 does not need to transmit the multiple pieces of changed data D101 in the order in which each piece of changed data D101 is acquired. The data transmission terminal 101 does not need to transmit the multiple pieces of unchanged data D201 in the order in which each piece of unchanged data D201 is acquired.

In the example shown in FIG. 9, the data transmission terminal 101 transmits multiple pieces of processed data D601 in the order in which each piece of processed data D601 is acquired. The data transmission terminal 101 does not need to transmit the multiple pieces of processed data D601 in the order in which each piece of processed data D601 is acquired.

The third embodiment may be applied to the data transmission terminal 101a shown in FIG. 5. The processor 111 transmits the sensor data acquired in Step S101 and the processed data generated in Step S131 to the external terminal by using the communicator 121. After the sensor data and the processed data are transmitted to the external terminal, the processor 111 may transmit the related data to the external terminal by using the communicator 121. After the related data are transmitted to the external terminal, the processor 111 may transmit the unchanged data and the unrelated data to the external terminal by using the communicator 121. After the unchanged data and the unrelated data are transmitted to the external terminal, the processor 111 may transmit the unclassified data to the external terminal by using the communicator 121.

The above-described data transmission terminal 101a does not need to transmit the changed data to the external terminal. After the unchanged data and the unrelated data are transmitted to the external terminal, the processor 111 may transmit the changed data to the external terminal by using the communicator 121. The changed data may be transmitted either before or after the unclassified data are transmitted.

The processor 111 generates the processed data by processing the first sensor data in Step S131. When the processor 111 determines that the state of the communication between the communicator 121 and the external terminal has shifted from the disconnected state to the normal state, the processor 111 transmits the processed data to the external terminal by using the communicator 121 in Step S133. After the processed data are transmitted to the external terminal, the processor 111 transmits the unchanged data to the external terminal by using the communicator 121 in Step S111.

When the data transmission terminal 101 having restrictions in communication is restored from the disconnected state, the data transmission terminal 101 can transmit sensor data required to be monitored to the external terminal with high priority. In a case in which the processed data are generated from the sensor data having a large data amount such as image data or audio data, the data size is considerably reduced. Therefore, the data transmission terminal 101 can transmit sensor data required to be monitored in a short period of time.

Modified Example of Third Embodiment

A modified example of the third embodiment of the present invention will be described.

Part of the processing shown in FIG. 8 is changed to the following processing. The processor 111 analyzes temporal transition of multiple pieces of first sensor data and generates summary data that represent a summary of the transition in Step S131. The summary data are a specific example of the processed data. When the state of the communication between the communicator 121 and the external terminal is the disconnected state, the summary data are stored on the memory 131 in Step S132. The processor 111 transmits the summary data to the external terminal by using the communicator 121 in Step S133.

After the processor 111 determines that the change greater than or equal to the predetermined amount has occurred, the processor 111 may generate the processed data. In such a case, the processor 111 stores only the sensor data on the memory 131 in Step S132. The processor 111 analyzes temporal transition of multiple pieces of changed data stored on the memory 131 and generates summary data that represent a summary of the transition.

The summary data represent what phenomenon occurs and at which time point the phenomenon occurs. For example, the summary data represent that "a landslide occurred between the time point 10:04:00 and the time point 10:04:30 and the landslide stopped between the time point 10:04:30 and the time point 10:05:04)."

The processor 111 determines or estimates the phenomenon that has occurred by analyzing temporal transition of the sensor data or the changed data. The criterion of determination for generating the summary data are stored on the memory 131 in advance. The criterion may be set through a user's operation of an operation unit not shown in the drawing. The communicator 121 may receive information that represents the criterion from the external terminal and the received information may be stored on the memory 131. Information that represents the criterion may be received from the external terminal through communication using another communicator not shown in the drawing and the received information may be stored on the memory 131. A recording medium on which information that represents the criterion is recorded may be connected to the data transmission terminal 101 and the information read from the recording medium may be stored on the memory 131. In the data transmission terminal 101 or the external terminal, the phenomenon may be estimated in accordance with deep learning or various kinds of learning.

The processor 111 may determine whether or not to generate the summary data each time the sensor data are acquired. For example, the processor 111 determines whether or not to generate the summary data in Step S131. At this time, the processor 111 determines whether or not to generate the summary data on the basis of the sensor data acquired in Step S101. The sensor data acquired onetime before may be stored on the memory 131 and the processor 111 may determine whether or not to generate the summary data on the basis of the sensor data acquired in Step S101 and the sensor data stored on the memory 131. When the processor 111 determines not to generate the summary data, the processor 111 does not need to generate the summary data. When the processor 111 determines to generate the summary data, the processor 111 generates the summary data.

The processor 111 does not need to generate the summary data each time the sensor data are acquired. The processor 111 may generate the summary data on the basis of only some of the multiple pieces of sensor data output from the first sensor 141. Only when the communication state is the disconnected state, the processor 111 may generate the summary data each time the sensor data am acquired. The processor 111 may generate the summary data after the processor 111 determines that the change greater than or equal to the predetermined amount has occurred. In such a case, the processor 111 may generate the summary data of the entire period in which the communication state is the disconnected state on the basis of the sensor data stored on the memory 131. Alternatively, the processor 111 may generate the summary data of the period in which the sensor data classified as the changed data are acquired on the basis of the sensor data stored on the memory 131.

The processor 111 may generate first summary data on the basis of the sensor data of the same type as the changed data and may generate second summary data on the basis of the sensor data of the different type from the changed data. For example, in a case in which the data transmission terminal 101a shown in FIG. 5 is used, the processor 111 may generate the first summary data on the basis of the first sensor data and may generate the second summary data on the basis of the second sensor data. For example, in a case in which the first sensor data are image data and the second sensor data are audio data, the processor 111 may generate the first summary data on the basis of the image data and may generate the second summary data on the basis of the audio data.

Figure 10:
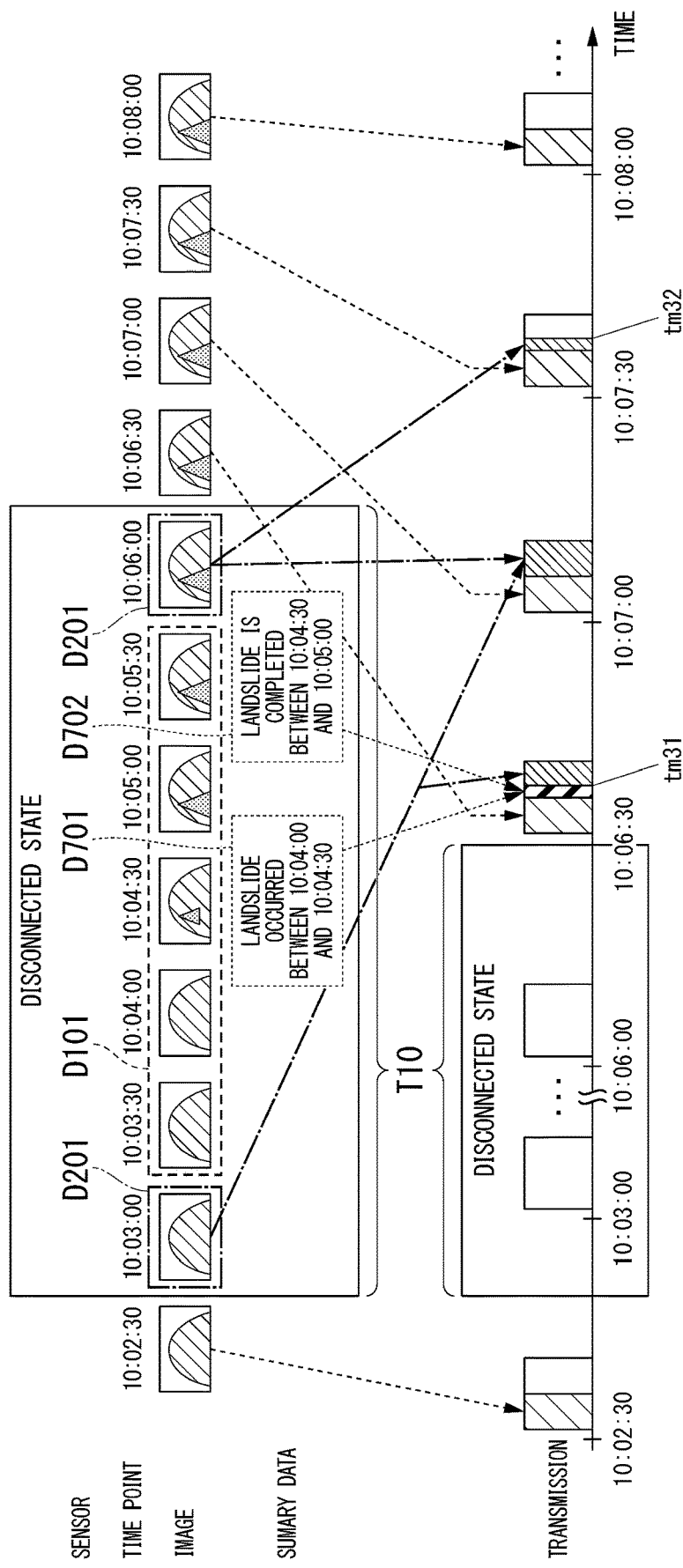
FIG. 10 is a diagram showing an example of communication in a modified example of the third embodiment of the present invention.

FIG. 10 shows an example of communication of sensor data. The same parts as those shown in FIG. 9 will not be described.

At the time point 10:04:30, the communication state between the data transmission terminal 101 and the external terminal is the disconnected state (Step S102). The processor 111 determines whether or not a certain phenomenon has occurred on the basis of the image data stored on the memory 131. The processor 111 determines that a landslide occurred between the time point 10:04:00 and the time point 10:04:30. The processor 111 generates summary data D701 that represent this phenomenon (Step S131).

The data transmission terminal 101 tries to connect to the external terminal, but is unable to connect to the external terminal (Step S103 and Step S104). Therefore, the data transmission terminal 101 stores the image data acquired at the time point 10:04:30 on the memory 131 and stores the time point 10:04:30 on the memory 131 (Step S132). The data transmission terminal 101 further stores the summary data D701 and the time point at which the summary data D701 are generated on the memory 131 (Step S132).

At the time point 10:05:30, the communication state between the data transmission terminal 101 and the external terminal is the disconnected state (Step S102). The processor 111 determines whether or not a certain phenomenon has occurred on the basis of the image data stored on the memory 131. The processor 111 determines that the landslide was completed between the time point 10:04:30 and the time point 10:05:00. The processor 111 generates summary data D702 that represent this phenomenon (Step S131). The generated summary data D702 are stored on the memory 131 in Step S132.

At the time point 10:06:30, the communication state between the data transmission terminal 101 and the external terminal is the disconnected state (Step S102). The data transmission terminal 101 connects to the external terminal (Step S103 and Step S104). The data transmission terminal 101 transmits the sensor data acquired at the time point 10:06:30, the stored summary data D701, and the stored summary data D702 to the external terminal (Step S133).

The modified example of the third embodiment may be applied to the data transmission terminal 101a shown in FIG. 5. The processor 111 transmits the sensor data acquired in Step S101 and the summary data generated in Step S131 to the external terminal by using the communicator 121. After the sensor data and the summary data are transmitted to the external terminal, the processor 111 may transmit the related data to the external terminal by using the communicator 121. After the related data are transmitted to the external terminal, the processor 111 may transmit the unchanged data and the unrelated data to the external terminal by using the communicator 121. After the unchanged data and the unrelated data are transmitted to the external terminal, the processor 111 may transmit the unclassified data to the external terminal by using the communicator 121.

The above-described data transmission terminal 101a does not need to transmit the changed data to the external terminal. After the unchanged data and the unrelated data are transmitted to the external terminal, the processor 111 may transmit the changed data to the external terminal by using the communicator 121. The changed data may be transmitted either before or after the unclassified data are transmitted.

When the data transmission terminal 101 having restrictions in communication is restored from the disconnected state, the data transmission terminal 101 can transmit sensor data required to be monitored to the external terminal with high priority. In a case in which the summary data are generated from the sensor data having a large data amount such as image data or audio data, the data size is considerably reduced. Therefore, the data transmission terminal 101 can transmit sensor data required to be monitored in a short period of time.

Fourth Embodiment

A fourth embodiment of the present invention will be described by using the data transmission terminal 101 shown in FIG. 1.

The processor 111 stores third sensor data on the memory 131 in a time-series manner. The third sensor data are the first sensor data output from the first sensor 141 after the processor 111 determines that the state of communication between the communicator 121 and an external terminal has shifted from a disconnected state to a normal state. The third sensor data are the first sensor data output from the first sensor 141 before transmission of changed data and unchanged data is completed. The processor 111 determines whether or not a change greater than or equal to a predetermined amount has occurred on the basis of multiple pieces of third sensor data stored on the memory 131. When the processor 111 determines that the change greater than or equal to the predetermined amount has occurred, the processor 111 classifies the multiple pieces of third sensor data stored on the memory 131 as changed data and unchanged data.

Figure 11:
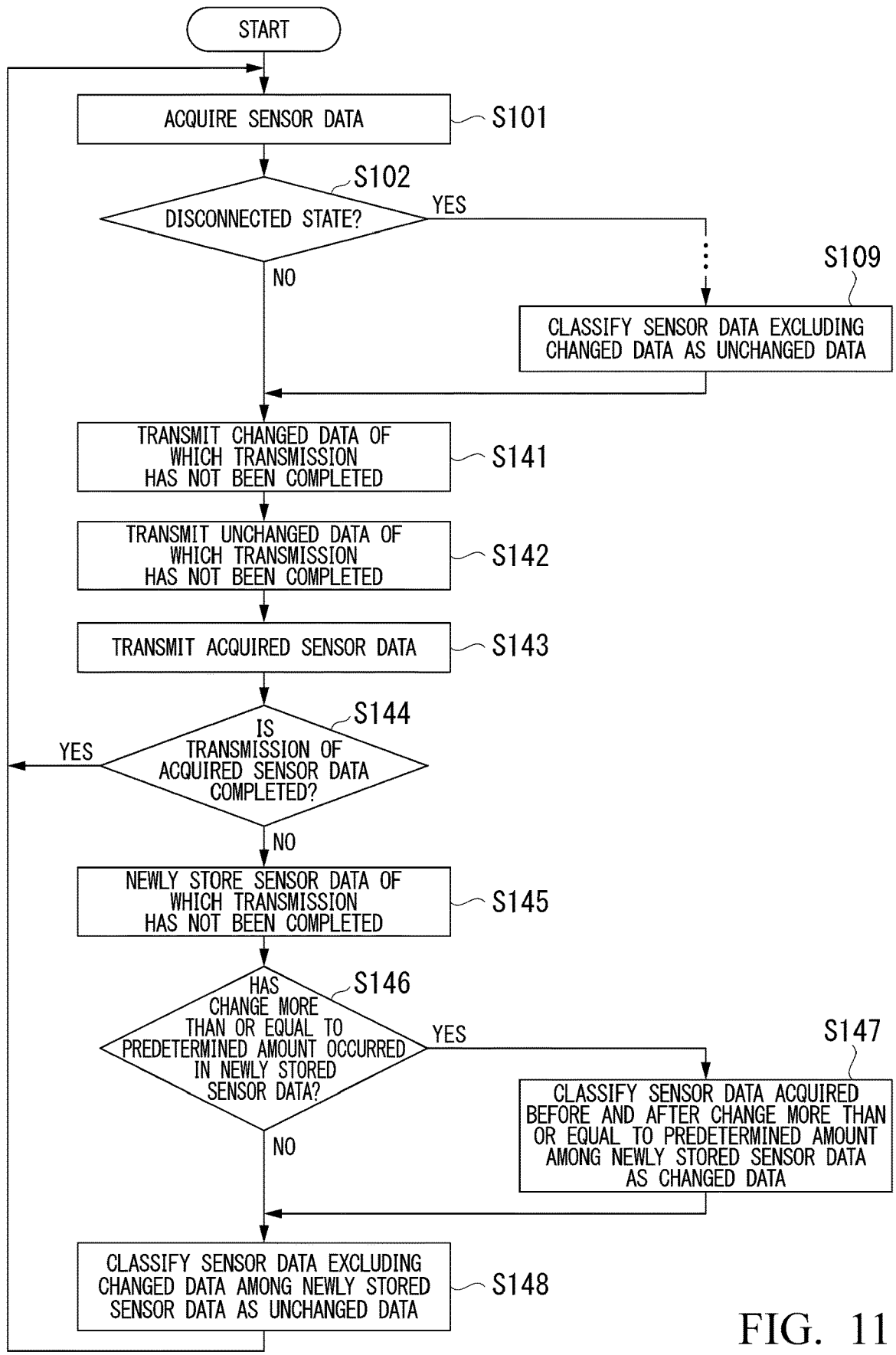
FIG. 11 is a flow chart showing a procedure of an operation of a data transmission terminal according to a fourth embodiment of the present invention.

An operation of the data transmission terminal 101 will be described. FIG. 11 shows a procedure of the operation of the data transmission terminal 101. The same processing as the processing shown in FIG. 2 will not be described. FIG. 11 includes the processing from Step S103 to Step S108 shown in FIG. 2. In FIG. 11, the processing from Step S103 to Step S108 is not shown.

After Step S109, the processor 111 transmits the changed data to the external terminal by using the communicator 121. At this time, the processor 111 transmits the changed data of which transmission has not been completed among the changed data stored on the memory 131 to the external terminal. In a case in which transmission of the changed data has been completed, the changed data are not transmitted.
(Step S142)

After Step S141, the processor 111 transmits the unchanged data to the external terminal by using the communicator 121. At this time, the processor 111 transmits the unchanged data of which transmission has not been completed among the unchanged data stored on the memory 131 to the external terminal. In a case in which transmission of the unchanged data has been completed, the unchanged data are not transmitted.
(Step S143)

After Step S142, the processor 111 transmits the sensor data to the external terminal by using the communicator 121. At this time, the processor 111 transmits the sensor data acquired in Step S101 to the external terminal.
(Step S144)

After Step S143, the processor 111 determines whether or not transmission of the sensor data acquired in Step S101 is completed. There is a case in which transmission of the sensor data is not completed in the transmission period given to the data transmission terminal 101. When the processor 111 determines that the transmission of the sensor data is completed in Step S144, the processing in Step S101 is executed.
(Step S145)

When the processor 111 determines that the transmission of the sensor data has not been completed in Step S144, the processor 111 stores the sensor data of which transmission has not been completed on the memory 131. For example, the processor 111 can distinguish the sensor data stored on the memory 131 in Step S105 and the sensor data stored on the memory 131 in Step S145 on the basis of the time point information attached to the sensor data.
(Step S146)

After Step S145, the processor 111 determines whether or not a change greater than or equal to a predetermined amount has occurred on the basis of the sensor data newly stored on the memory 131 in Step S145. In this way, the processor 111 determines whether or not a new change has occurred. The predetermined amount in Step S146 is the same as the predetermined amount in Step S107. When the processor 111 determines that the change greater than or equal to the predetermined amount has not occurred in Step S146, the processing in Step S148 is executed. Details of the processing in Step S148 will be described later.
(Step S147)

When the processor 111 determines that the change greater than or equal to the predetermined amount has occurred in Step S146, the processor 111 classifies the sensor data acquired before and after the change as changed data (new changed data). The method of classification in Step S147 is the same as the method of classification in Step S108.
(Step S148)

After Step S147, the processor 111 classifies the sensor data excluding the changed data among the sensor data stored in Step S145 as unchanged data (new unchanged data). The method of classification in Step S148 is the same as the method of classification in Step S109. After Step S148, the processing in Step S101 is executed.

When the data transmission terminal 101 has a transmission opportunity, the data transmission terminal 101 transmits data in Step S141, Step S142, and Step S143. When the other terminals are not wirelessly transmitting data, the data transmission terminal 101 can transmit data. Alternatively, in a time slot allocated to the data transmission terminal 101, the data transmission terminal 101 can transmit data. There is a case in which the data transmission terminal 101 is unable to complete transmission of each piece of data by the time the next sensor data acquisition (Step S101) is performed. After the next sensor data acquisition (Step S101) is performed, the data transmission terminal 101 transmits the sensor data that have not been transmitted.

Figure 12:
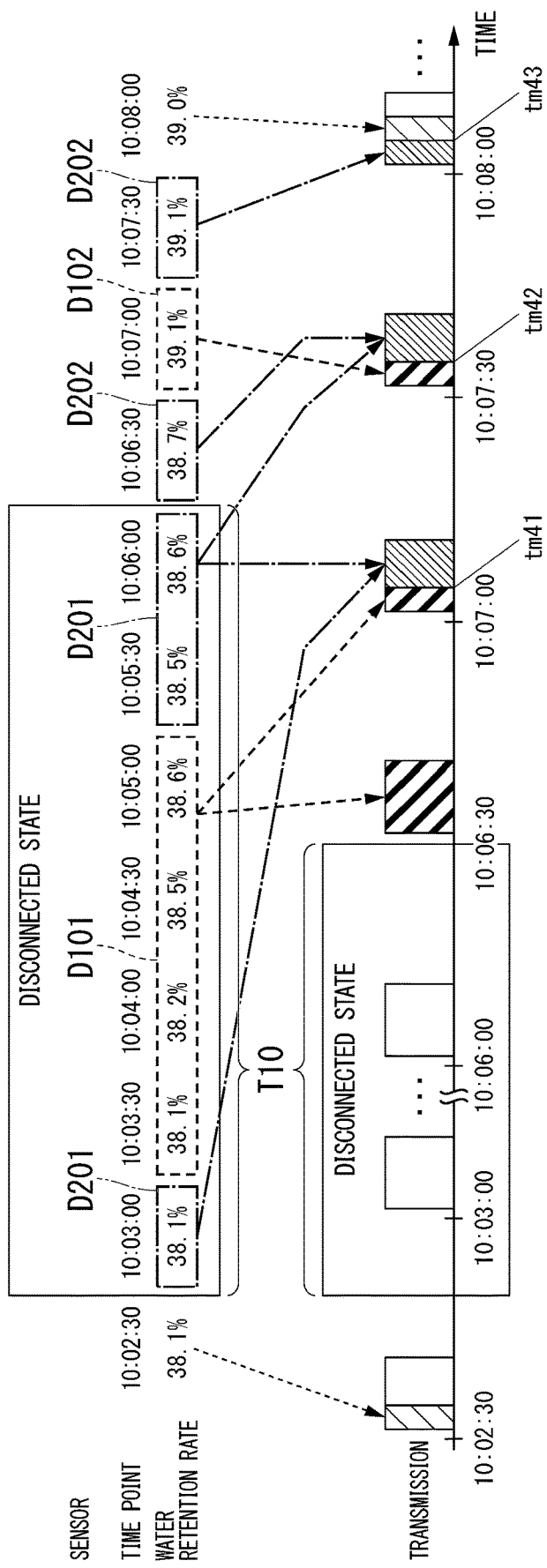
FIG. 12 is a diagram showing an example of communication in the fourth embodiment of the present invention.
Figure 13:
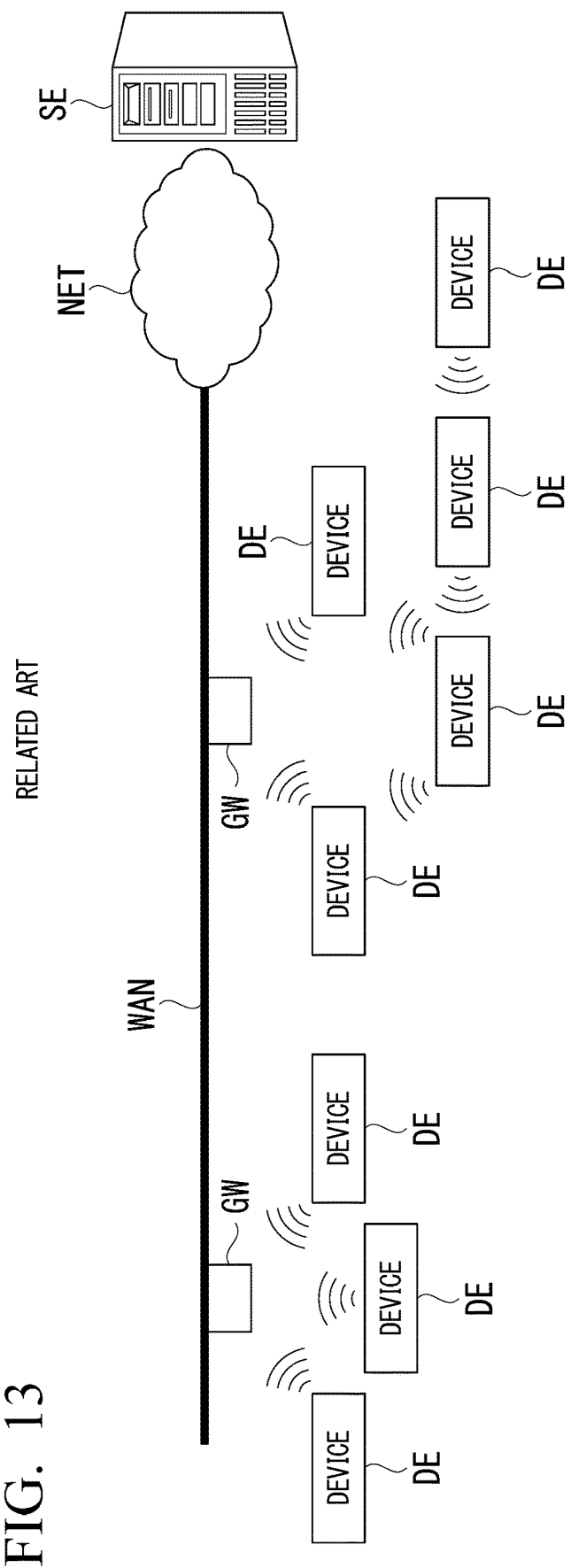
FIG. 13 is a diagram showing a configuration of a network.
Figure 14:
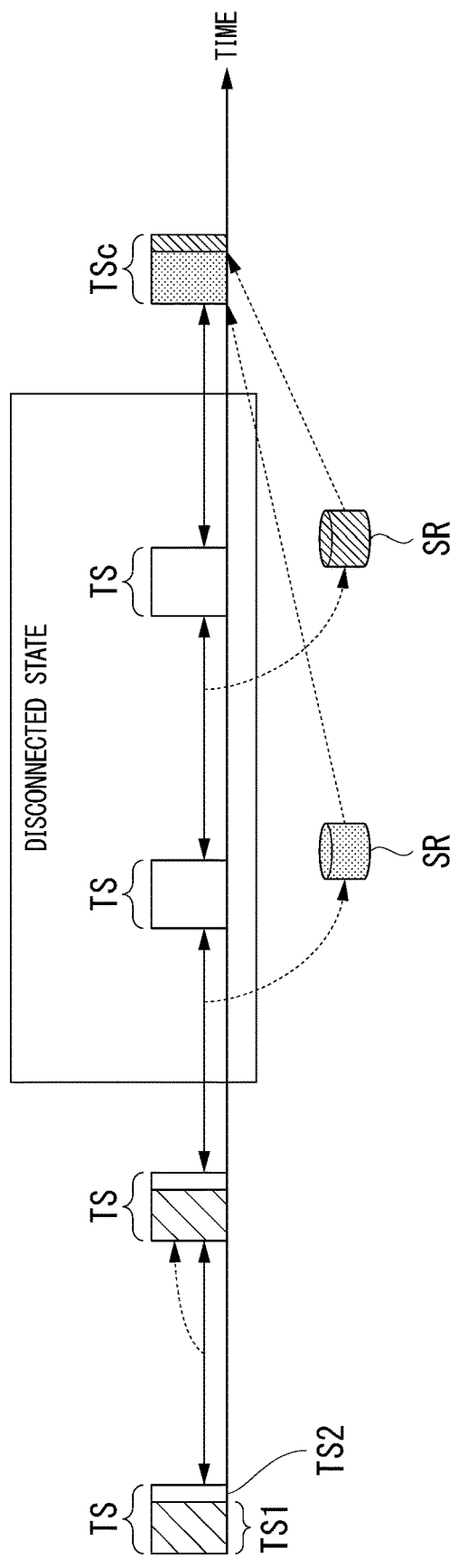
FIG. 14 is a diagram showing an example of a communication state.

FIG. 12 shows an example of communication of sensor data. An example in which the first sensor 141 acquires water-retention-rate data in soil will be described. The same parts as those shown in FIG. 4 will not be described.

The data transmission terminal 101 transmits the stored changed data D101 to the external terminal at the time point 10:06:30 (Step S141). The data transmission terminal 101 can transmit the water-retention-rate data in soil of one time and the time point at which the water-retention-rate data are acquired in a period that is one-third of the transmission period. Therefore, the data transmission terminal 101 can transmit the changed data D101 of three times and the time points at which the changed data D101 are acquired in the transmission period of one time. Specifically, the data transmission terminal 101 transmits the changed data D101 acquired at each of the time point 10:03:30 to the time point 10:04:30 to the external terminal and transmits the time point at which each piece of the changed data D101 is acquired to the external terminal.

Before the data transmission terminal 101 transmits the water-retention-rate data acquired at the time point 10:06:30, the transmission period allocated to the data transmission terminal 101 is completed. Therefore, the data transmission terminal 101 is unable to transmit the water-retention-rate data acquired at the time point 10:06:30 (Step S144). The data transmission terminal 101 stores the water-retention-rate data acquired at the time point 10:06:30 on the memory 131 and stores the time point 10:06:30 on the memory 131 (Step S145).

The change greater than or equal to the predetermined amount has not occurred between the water-retention-rate data acquired at the time point 10:06:00 and the water-retention-rate data acquired at the time point 10:06:30 (Step S146). The data transmission terminal 101 classifies the water-retention-rate data acquired at the time point 10:06:30 as unchanged data D202 (Step S148).

At the time point 10:07:00, the communication state between the data transmission terminal 101 and the external terminal is the normal state (Step S102). At the time point 10:07:00, transmission of the changed data D101 acquired at the time point 10:05:00 has not been completed. The data transmission terminal 101 transmits the changed data D101 acquired at the time point 10:05:00 to the external terminal and transmits the time point 10:05:00 to the external terminal (Step S141). In this way, transmission of the changed data D101 stored on the memory 131 is completed (timing tm41).

At the time point 10:07:00, transmission of the unchanged data D201 acquired at each of the time point 10:03:00, the time point 10:05:30, and the time point 10:06:00 and the unchanged data D202 acquired at the time point 10:06:30 has not been completed. The data transmission terminal 101 transmits the unchanged data D201 acquired at each of the time point 10:03:00 and the time point 10:05:30 to the external terminal and transmits the time point at which each piece of the unchanged data D201 is acquired to the external terminal (Step S142).

Before the data transmission terminal 101 transmits the water-retention-rate data acquired at the time point 10:07:00, the transmission period allocated to the data transmission terminal 101 is completed. Therefore, the data transmission terminal 101 is unable to transmit the water-retention-rate data acquired at the time point 10:07:00 (Step S144). The data transmission terminal 101 stores the water-retention-rate data acquired at the time point 10:07:00 on the memory 131 and stores the time point 10:07:00 on the memory 131 (Step S145).

The change greater than or equal to the predetermined amount has occurred between the water-retention-rate data acquired at the time point 10:06:30 and the water-retention-rate data acquired at the time point 10:07:00 (Step S146). The data transmission terminal 101 classifies the water-retention-rate data acquired at the time point 10:07:00 as changed data D102 (Step S147). No water-retention-rate data are newly stored on the memory 131 other than the water-retention-rate data acquired at the time point 10:07:00. Therefore, no water-retention-rate data are newly classified as the unchanged data D202 (Step S148).

At the time point 10:07:30, the communication state between the data transmission terminal 101 and the external terminal is the normal state (Step S102). At the time point 10:07:30, transmission of the changed data D102 acquired at the time point 10:07:00 has not been completed. The data transmission terminal 101 transmits the changed data D102 acquired at the time point 10:07:00 to the external terminal and transmits the time point 10:07:00 to the external terminal (Step S141). In this way, transmission of the changed data D102 stored on the memory 131 is completed (timing tm42).

At the time point 10:07:30, transmission of the unchanged data D201 acquired at the time point 10:06:00 and the unchanged data D202 acquired at the time point 10:06:30 has not been completed. The data transmission terminal 101 transmits the unchanged data D201 acquired at the time point 10:06:0) to the external terminal and transmits the time point 10:06:00 to the external terminal (Step S142). The data transmission terminal 101 transmits the unchanged data D202 acquired at the time point 10:06:30 and transmits the time point 10:06:30 to the external terminal (Step S142).

Before the data transmission terminal 101 transmits the water-retention-rate data acquired at the time point 10:07:30, the transmission period allocated to the data transmission terminal 101 is completed. Therefore, the data transmission terminal 101 is unable to transmit the water-retention-rate data acquired at the time point 10:07:30 (Step S144). The data transmission terminal 101 stores the water-retention-rate data acquired at the time point 10:07:30 on the memory 131 and stores the time point 10:07:30 on the memory 131 (Step S145).

The change greater than or equal to the predetermined amount has not occurred between the water-retention-rate data acquired at the time point 10:07:00 and the water-retention-rate data acquired at the time point 10:07:30 (Step S146). The data transmission terminal 101 classifies the water-retention-rate data acquired at the time point 10:07:30 as unchanged data D202 (Step S148).

At the time point 10:08:00, the communication state between the data transmission terminal 101 and the external terminal is the normal state (Step S102). At the time point 10:08:00, transmission of the unchanged data D202 acquired at the time point 10:07:30 has not been completed. The data transmission terminal 101 transmits the unchanged data D202 acquired at the time point 10:07:30 to the external terminal and transmits the time point 10:07:30 to the external terminal (Step S142). In this way, transmission of the unchanged data D202 stored on the memory 131 is completed (timing tm43).

When this transmission is completed, transmission of all pieces of changed data D102 and all pieces of unchanged data D202 has been completed. The data transmission terminal 101 transmits the sensor data acquired at the time point 10:08:00 to the external terminal and transmits the time point 10:08:00 to the external terminal (Step S143). The data transmission terminal 101 executes transmission similar to that executed at the time point 10:02:30 in a transmission period after the time point 10:08:00. In other words, in the allocated transmission period, the data transmission terminal 101 transmits the water-retention-rate data acquired in Step S101 and the time point at which the water-retention-rate data are acquired to the external terminal (Step S143).

The data transmission terminal 101 does not need to transmit the multiple pieces of changed data D101 in the order in which each piece of changed data D101 is acquired. The data transmission terminal 101 does not need to transmit the multiple pieces of unchanged data D201 in the order in which each piece of unchanged data D201 is acquired.

In the example shown in FIG. 12, the data transmission terminal 101 transmits multiple pieces of changed data D102 in the order in which each piece of changed data D102 is acquired. The data transmission terminal 101 does not need to transmit the multiple pieces of changed data D102 in the order in which each piece of changed data D102 is acquired.

In the example shown in FIG. 12, the data transmission terminal 101 transmits multiple pieces of unchanged data D202 in the order in which each piece of unchanged data D202 is acquired. The data transmission terminal 101 does not need to transmit the multiple pieces of unchanged data D202 in the order in which each piece of unchanged data D202 is acquired.

The fourth embodiment may be applied to the data transmission terminal 101*a* shown in FIG. 5. The processor 111 stores fourth sensor data on the memory 131 in a time-series manner. The fourth sensor data are the second sensor data output from the second sensor 142 after the processor 111 determines that the communication state has shifted from the disconnected state to the normal state. The fourth sensor data are the second sensor data output from the second sensor 142 before transmission of the changed data and the unchanged data is completed. When the processor 111 determines that the change greater than or equal to the predetermined amount has occurred on the basis of the third sensor data, the processor 111 classifies the multiple pieces of fourth sensor data stored on the memory 131 as related data and unrelated data.

The processor 111 transmits the changed data to the external terminal by using the communicator 121. After the changed data are transmitted to the external terminal, the processor 111 may transmit the related data to the external terminal by using the communicator 121. After the related data are transmitted to the external terminal, the processor 111 may transmit the unchanged data and the unrelated data to the external terminal by using the communicator 121. After the unchanged data and the unrelated data are transmitted to the external terminal, the processor 111 may transmit the unclassified data to the external terminal by using the communicator 121. After the unclassified data are transmitted to the external terminal, the processor 111 may transmit the sensor data acquired in Step S101 to the external terminal by using the communicator 121.

The processor 111 stores the first sensor data of which transmission has not been completed as the third sensor data on the memory 131 in a time-series manner in Step S145. The processor 111 determines whether or not the change greater than or equal to the predetermined amount has occurred on the basis of the multiple pieces of third sensor data stored on the memory 131 in Step S46. When the processor 111 determines that the change greater than or equal to the predetermined amount has occurred, the processor 111 classifies the multiple pieces of third sensor data stored on the memory 131 as changed data and unchanged data in Step S147 and Step S148.

When the data transmission terminal 101 having restrictions in communication is restored from the disconnected state, the data transmission terminal 101 can transmit sensor data required to be monitored to the external terminal with high priority. After the data transmission terminal 101 is restored from the disconnected state, the data transmission terminal 101 can give priority to the changed data of which transmission has not been completed and the unchanged data of which transmission has not been completed over the newly acquired sensor data. In the example shown in FIG. 12, the data transmission terminal 101 can transmit the sensor data in the order in which the sensor data are output from the first sensor 141.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. A data transmission terminal, comprising:
a first sensor;
a memory;
a communicator; and
a processor,
wherein the processor is configured to transmit first sensor data output from the first sensor to an external terminal by using the communicator,
the processor is configured to determine a state of communication between the communicator and the external terminal,
the processor is configured to store multiple pieces of the first sensor data on the memory in a time-series manner when the processor determines that the state of the communication has shifted from a normal state to a disconnected state,
the processor is configured to determine whether a change greater than or equal to a predetermined amount has occurred between values represented by the multiple pieces of the first sensor data stored on the memory when the processor determines that the state of the communication has shifted from the disconnected state to the normal state,
the processor is configured to classify the multiple pieces of the first sensor data stored on the memory as changed data and unchanged data when the processor determines that the change has occurred, the changed data being output from the first sensor in a period in which the change occurs, the unchanged data being output from the first sensor in a period different from the period in which the change occurs,
the processor is configured to transmit the changed data to the external terminal by using the communicator, and
the processor is configured to transmit the unchanged data to the external terminal by using the communicator after the changed data are transmitted to the external terminal.
2. The data transmission terminal according to claim 1, further comprising a second sensor different from the first sensor, wherein the processor is configured to transmit second sensor data output from the second sensor to the external terminal by using the communicator, the processor is configured to store multiple pieces of the second sensor data on the memory in a time-series manner when the processor determines that the state of the communication has shifted from the normal state to the disconnected state, the processor is configured to classify the multiple pieces of the second sensor data stored on the memory as related data and unrelated data when the processor determines that the change has occurred, the related data being output from the second sensor in the period in which the change occurs, the unrelated data being output from the second sensor in a period different from the period in which the change occurs, the processor is configured to transmit the changed data and the related data to the external terminal by using the communicator, and the processor is configured to transmit the unchanged data and the unrelated data to the external terminal by using the communicator after the changed data and the related data are transmitted to the external terminal.

3. The data transmission terminal according to claim 1, wherein the processor is configured to store multiple pieces of third sensor data on the memory in a time-series manner, the multiple pieces of the third sensor data being the first sensor data output from the first sensor after the processor determines that the state of the communication has shifted from the disconnected state to the normal state and being the first sensor data output from the first sensor before transmission of the changed data and the unchanged data is completed, the processor is configured to determine whether the change has occurred on the basis of the multiple pieces of the third sensor data stored on the memory, and the processor is configured to classify the multiple pieces of the third sensor data stored on the memory as the changed data and the unchanged data when the processor determines that the change has occurred.

4. A data transmission terminal, comprising:

a first sensor;

a memory;

a communicator; and a processor, wherein the processor is configured to transmit first sensor data output from the first sensor to an external terminal by using the communicator, the processor is configured to determine a state of communication between the communicator and the external terminal, the processor is configured to store multiple pieces of the first sensor data on the memory in a time-series manner when the processor determines that the state of the communication has shifted from a normal state to a disconnected state, the processor is configured to generate processed data by processing the first sensor data output from the first sensor or the first sensor data stored on the memory, the processor is configured to determine whether a change greater than or equal to a predetermined amount has occurred between values represented by the multiple pieces of the first sensor data stored on the memory when the processor determines that the state of the communication has shifted from the disconnected state to the normal state, the processor is configured to classify the multiple pieces of the first sensor data stored on the memory as changed data and unchanged data when the processor determines that the change has occurred, the changed data being output from the first sensor in a period in which the change occurs, the unchanged data being output from the first sensor in a period different from the period in which the change occurs, the processor is configured to transmit the processed data to the external terminal by using the communicator, and the processor is configured to transmit the unchanged data to the external terminal by using the communicator after the processed data are transmitted to the external terminal.

5. A data transmission terminal, comprising:

a first sensor;

a memory;

a communicator; and a processor, wherein the processor is configured to transmit first sensor data output from the first sensor to an external terminal by using the communicator, the processor is configured to determine a state of communication between the communicator and the external terminal, the processor is configured to store multiple pieces of the first sensor data on the memory in a time-series manner when the processor determines that the state of the communication has shifted from a normal state to a disconnected state, the processor is configured to determine whether a change greater than or equal to a predetermined amount has occurred between values represented by the multiple pieces of the first sensor data stored on the memory when the processor determines that the state of the communication has shifted from the disconnected state to the normal state, the processor is configured to classify the multiple pieces of the first sensor data stored on the memory as changed data and unchanged data when the processor determines that the change has occurred, the changed data being output from the first sensor in a period in which the change occurs, the unchanged data being output from the first sensor in a period different from the period in which the change occurs, the processor is configured to generate processed data by processing the changed data, the processor is configured to transmit the processed data to the external terminal by using the communicator, and the processor is configured to transmit the unchanged data to the external terminal by using the communicator after the processed data are transmitted to the external terminal.

6. The data transmission terminal according to claim 4, wherein the processor is configured to analyze temporal transition of the multiple pieces of the first sensor data and generate the processed data that represent a summary of the transition.

7. The data transmission terminal according to claim 5, wherein the processor is configured to analyze temporal transition of multiple pieces of the changed data and generate the processed data that represent a summary of the transition.

8. The data transmission terminal according to claim 4, wherein the processor is configured to transmit the processed data and the unchanged data to the external terminal by using the communicator when the processor determines that the state of the communication has shifted from the disconnected state to the normal state, and the processor is configured to transmit the changed data to the external terminal by using the communicator after the processed data and the unchanged data are transmitted to the external terminal.

9. The data transmission terminal according to claim 5, wherein the processor is configured to transmit the processed data and the unchanged data to the external terminal by using the communicator when the processor determines that the state of the communication has shifted from the disconnected state to the normal state, and the processor is configured to transmit the changed data to the external terminal by using the communicator after the processed data and the unchanged data are transmitted to the external terminal.

10. A data transmission method of a data transmission terminal including a first sensor, a memory, a communicator, and a processor, the method comprising:

transmitting, by the processor, first sensor data output from the first sensor to an external terminal by using the communicator;

determining, by the processor, a state of communication between the communicator and the external terminal, storing, by the processor, multiple pieces of the first sensor data on the memory in a time-series manner when the processor determines that the state of the communication has shifted from a normal state to a disconnected state, determining, by the processor, whether a change greater than or equal to a predetermined amount has occurred between values represented by the multiple pieces of the first sensor data stored on the memory when the processor determines that the state of the communication has shifted from the disconnected state to the normal state, classifying, by the processor, the multiple pieces of the first sensor data stored on the memory as changed data and unchanged data when the processor determines that the change has occurred, the changed data being output from the first sensor in a period in which the change occurs, the unchanged data being output from the first sensor in a period different from the period in which the change occurs, transmitting, by the processor, the changed data to the external terminal by using the communicator, and transmitting, by the processor, the unchanged data to the external terminal by using the communicator after the changed data are transmitted to the external terminal.

11. A non-transitory computer-readable recording medium saving a program for causing a processor of a data transmission terminal including a first sensor, a memory, a communicator, and the processor configured to execute:

transmitting first sensor data output from the first sensor to an external terminal by using the communicator;

determining a state of communication between the communicator and the external terminal, storing multiple pieces of the first sensor data on the memory in a time-series manner when the processor determines that the state of the communication has shifted from a normal state to a disconnected state, determining whether a change greater than or equal to a predetermined amount has occurred between values represented by the multiple pieces of the first sensor data stored on the memory when the processor determines that the state of the communication has shifted from the disconnected state to the normal state, classifying the multiple pieces of the first sensor data stored on the memory as changed data and unchanged data when the processor determines that the change has occurred, the changed data being output from the first sensor in a period in which the change occurs, the unchanged data being output from the first sensor in a period different from the period in which the change occurs, transmitting the changed data to the external terminal by using the communicator, and transmitting the unchanged data to the external terminal by using the communicator after the changed data are transmitted to the external terminal.

\* \* \* \* \*